US010053145B2

(12) United States Patent
Akatsuka et al.

(10) Patent No.: US 10,053,145 B2
(45) Date of Patent: Aug. 21, 2018

(54) APPARATUS FOR CONTROLLING STEERING DEVICE OF VEHICLE

(71) Applicant: DENSO CORPORATION, Kariya, Aichi-pref. (JP)

(72) Inventors: Hisaya Akatsuka, Kariya (JP); Hiroshi Inou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/653,339

(22) Filed: Jul. 18, 2017

(65) Prior Publication Data

US 2018/0022382 A1    Jan. 25, 2018

(30) Foreign Application Priority Data

Jul. 19, 2016    (JP) .................................. 2016-141727

(51) Int. Cl.
*B62D 6/00* (2006.01)
*B60T 8/1755* (2006.01)
*B60W 30/045* (2012.01)
*B62D 5/00* (2006.01)

(52) U.S. Cl.
CPC ............ *B62D 6/003* (2013.01); *B60T 8/1755* (2013.01); *B60W 30/045* (2013.01); *B62D 5/008* (2013.01); *B60T 2201/16* (2013.01); *B60T 2260/02* (2013.01)

(58) Field of Classification Search
CPC ......... D62D 6/00; D62D 5/00; B60W 30/045; B60T 8/1755
USPC .......................................................... 701/41
See application file for complete search history.

(56) References Cited

U.S. PATENT DOCUMENTS

| 2006/0030987 | A1 | 2/2006 | Akita |
| 2009/0265062 | A1 | 10/2009 | Nguyen Van et al. |
| 2012/0215377 | A1* | 8/2012 | Takemura ............. B60W 30/12 701/1 |
| 2013/0060427 | A1 | 3/2013 | Kataoka et al. |

(Continued)

FOREIGN PATENT DOCUMENTS

| JP | 2006-151066 | 6/2006 |
| JP | 2006-347461 | 12/2006 |

(Continued)

*Primary Examiner* — Tan Q Nguyen
(74) *Attorney, Agent, or Firm* — Knobbe, Martens, Olson & Bear, LLP

(57) ABSTRACT

A target steering angle calculator calculates, based on a target curvature, a target steering angle representing a steering angle of the vehicle at a target position. A current steering-angle obtainer obtains a current steering angle representing a steering angle of the vehicle at a current position. A steering controller controls the steering of the vehicle to cause the current steering angle to follow the target steering angle. A distance estimator estimates, based on at least one of the environmental information around the vehicle and control information about the vehicle, a visible distance representing a distance visibly recognizable by the driver of the vehicle to a front of the vehicle. The target curvature obtainer uses the visible distance as the target distance to obtain the target curvature at the predetermined target position that has the visible distance away from the current position along the road in the travelling direction.

12 Claims, 18 Drawing Sheets

(56) References Cited

U.S. PATENT DOCUMENTS

2013/0131925 A1 5/2013 Isaji et al.
2017/0008521 A1* 1/2017 Braunstein ............ G01C 21/32

FOREIGN PATENT DOCUMENTS

| JP | 2007-326534 | 12/2007 |
| JP | 2008-044531 A | 2/2008 |
| JP | 2010-069921 | 4/2010 |
| JP | 2010-151570 | 7/2010 |
| JP | 2015-020604 | 2/2015 |
| JP | 2015-150963 | 8/2015 |

* cited by examiner

APPARATUS FOR CONTROLLING STEERING DEVICE OF VEHICLE

CROSS REFERENCE TO RELATED APPLICATIONS

This application is based on and claims the benefit of priority from Japanese Patent Application 2016-141727 filed on Jul. 19, 2016, the disclosure of which is incorporated in its entirety herein by reference.

TECHNICAL FIELD

The present disclosure relates to apparatuses for assisting a driver's driving of a vehicle.

BACKGROUND

Steering technologies aim to assist a driver's steering effort of a steering wheel of a vehicle using a steering device. Specifically, these technologies determine the value of assist torque for assisting the driver's present steering effort of the steering wheel, and control the steering device to apply the determined value of the assist torque to the steering wheel.

A known example of these steering technologies is designed to control the value of assist torque applied to the steering wheel of the vehicle in accordance with the curvature of a road on which the vehicle is cruising.

For example, Japanese Patent Application Publication 2008-44531 discloses a technology that captures an image in front of a vehicle using a camera, and detects, based on the captured image, the curvature of a road in front of the vehicle. The technology disclosed in the Patent Publication 2008-44531 will be referred to as a published technology.

SUMMARY

The published technology detects the curvature of a road in front of the vehicle using the camera. This may unfortunately fail to detect the curvature of a road in front of the vehicle with high accuracy if weather conditions around the vehicle may result in the qualities of images captured by the camera deteriorating. This may make it difficult for the driver to accurately drive or cruise the vehicle along the shape, i.e. the curvature, of the road in front of the vehicle.

In view of the circumstances, a first aspect of the present disclosure seeks to provide apparatuses for controlling a steering device to assist a driver's steering effort of a steering wheel of a vehicle, each of which is capable of addressing the problem set forth above.

Specifically, a second aspect of the present disclosure seeks to provide such apparatuses, each of which enables the driver of a vehicle to accurately cruise the vehicle along the shape of a road in front of the vehicle independently of weather conditions around the vehicle.

According to a first exemplary aspect of the present disclosure, there is provided an apparatus for controlling steering of a vehicle. The apparatus includes a position obtainer configured to obtain a current position of the vehicle, and a road information obtainer configured to obtain road information about a road on which the vehicle is travelling. The road information includes information indicative of a shape of the road extending in a travelling direction of the vehicle. The apparatus includes a target curvature obtainer configured to obtain a target curvature at a predetermined target position on the road. The target curvature is estimated based on the current position of the vehicle and the road information. The target position has a predetermined target distance away from the current position along the road in the travelling direction. The apparatus includes a target steering angle calculator configured to calculate, based on the target curvature, a target steering angle representing the steering angle of the vehicle at the target position. The apparatus includes a current steering-angle obtainer configured to obtain a current steering angle representing the steering angle of the vehicle at the current position. The apparatus includes a steering controller configured to control the steering of the vehicle to cause the current steering angle to follow the target steering angle. The apparatus includes a distance estimator configured to obtain at least one of environmental information around the vehicle and control information about the vehicle. The distance estimator is configured to estimate, based on the at least one of the environmental information around the vehicle and control information about the vehicle, a visible distance representing a distance visibly recognizable by the driver of the vehicle to a front of the vehicle. The target curvature obtainer is configured to use the visible distance as the target distance to obtain the target curvature at the predetermined target position that has the visible distance away from the current position along the road in the travelling direction.

According to a second exemplary aspect of the present disclosure, there is provided an apparatus for controlling steering of a vehicle. The apparatus includes a position obtainer configured to obtain a current position of the vehicle, and a road information obtainer configured to obtain road information about a road on which the vehicle is travelling. The road information includes information indicative of a shape of the road extending in a travelling direction of the vehicle. The apparatus includes a target curvature obtainer configured to obtain a target curvature at a predetermined target position on the road. The target curvature is estimated based on the current position of the vehicle and the road information. The target position has a predetermined target distance away from the current position along the road in the travelling direction. The apparatus includes a target steering angle calculator configured to calculate, based on the target curvature, a target steering angle representing the steering angle of the vehicle at the target position. The apparatus includes a current steering-angle obtainer configured to obtain a current steering angle representing the steering angle of the vehicle at the current position. The apparatus includes a steering controller configured to control the steering of the vehicle to cause the current steering angle to follow the target steering angle. The apparatus is configured to change the target distance based on at least one of environmental information around the vehicle and control information about the vehicle.

According to a third exemplary aspect of the present disclosure, there is provided a method of controlling steering of a vehicle. The method includes obtaining a current position of the vehicle, and obtaining road information about a road on which the vehicle is travelling. The road information includes information indicative of a shape of the road extending in a travelling direction of the vehicle. The method includes obtaining a target curvature at a predetermined target position on the road. The target curvature is estimated based on the current position of the vehicle and the road information. The target position has a predetermined target distance away from the current position along the road in the travelling direction. The method includes calculating, based on the target curvature, a target steering angle representing the steering angle of the vehicle at the target position, and obtaining a current steering angle representing the steering angle of the vehicle at the current position. The method includes controlling the steering of the vehicle to cause the current steering angle to follow the target steering angle, and obtaining at least one of environmental information around the vehicle and control information about the vehicle. The method includes estimating, based on the at least one of the environmental information around the vehicle and control information about the vehicle, a visible distance representing a distance visibly recognizable by the driver of the vehicle to a front of the vehicle. The obtaining of the target curvature obtaining uses the visible distance as the target distance to obtain the target curvature at the predetermined target position that has the visible distance away from the current position along the road in the travelling direction.

According to a fourth exemplary aspect of the present disclosure, there is provided a method of controlling steering of a vehicle. The method includes obtaining a current position of the vehicle, and obtaining road information about a road on which the vehicle is travelling. The road information includes information indicative of a shape of the road extending in a travelling direction of the vehicle. The method includes obtaining a target curvature at a predetermined target position on the road. The target curvature is estimated based on the current position of the vehicle and the road information. The target position has a predetermined target distance away from the current position along the road in the travelling direction. The method includes calculating, based on the target curvature, a target steering angle representing the steering angle of the vehicle at the target position, and obtaining a current steering angle representing the steering angle of the vehicle at the current position. The method includes controlling the steering of the vehicle to cause the current steering angle to follow the target steering angle, and changing the target distance based on at least one of environmental information around the vehicle and control information about the vehicle.

The control apparatus according to each of the first and third exemplary aspects is configured to 1. Estimate, based on the at least one of the environmental information around the vehicle and control information about the vehicle, a visible distance representing a distance visibly recognizable by the driver of the vehicle to a front of the vehicle 2. Change the target distance based on at least one of environmental information around the vehicle and control information about the vehicle.

That is, this configuration reduces the impact of environmental conditions, such as weather information, on the calculation of the target steering angle, because the target distance is changed depending on at least one of the items of environmental information around the vehicle and control information about the vehicle.

This therefore enables the vehicle to travel along the shape of the road based on the target steering angle with higher accuracy.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
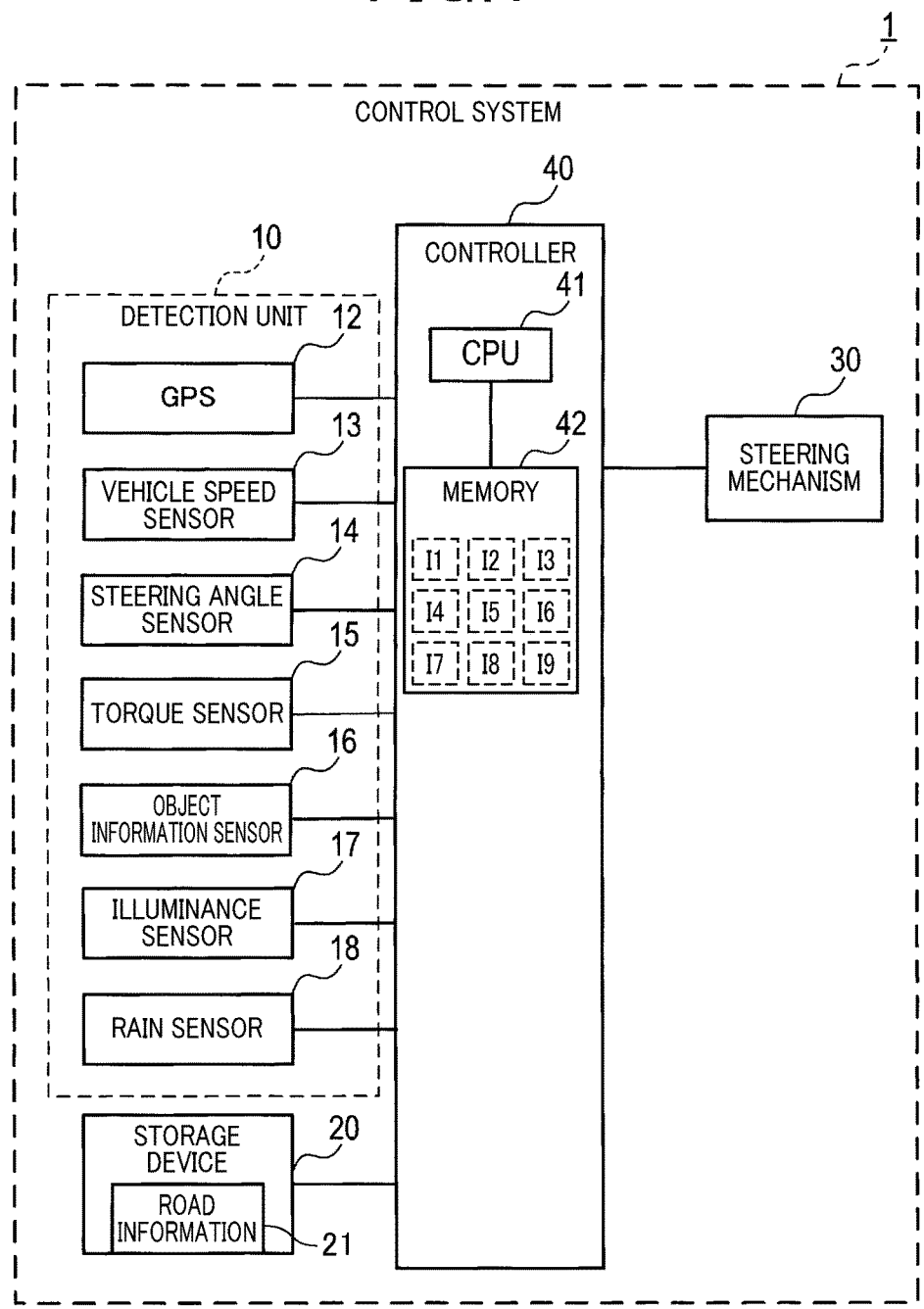
FIG. 1 is a block diagram schematically illustrating an example of a steering system according to the first embodiment of the present disclosure.

The following describes preferred embodiments of the present disclosure with reference to the accompanying drawings. In the embodiments, like parts between the embodiments, to which like reference characters are assigned, are omitted or simplified to avoid redundant description.

First Embodiment

The following describes the first embodiment of the present disclosure with reference to FIGS. 1 to 10.

Referring to FIG. 1, a control system 1 installed in a vehicle VE includes a detection unit 10, a storage device 20, a steering mechanism 30, and a controller 40. At least the controller 40 serves as, for example, a control apparatus. That is, the controller 40 and at least one of the peripheral devices can constitute a control apparatus.

The detection unit 10 includes a global positioning system (GPS) sensor 12, a vehicle speed sensor 13, a steering angle sensor 14, and a torque sensor 15.

The GPS sensor 12 receives GPS signals from GPS satellites, and determines the current position of a predetermined point, such as the center of gravity, of the vehicle VE based on the GPS signals. The current position of the predetermined point of the vehicle VE will also be simply referred to as the current position of the vehicle VE.

The vehicle speed sensor 13 measures the speed of the vehicle VE, and outputs the measured speed of the vehicle VE to the controller 40.

The steering angle sensor 14 measures a real steering angle $\delta_{real}$ of the vehicle VE, and outputs the real steering angle $\delta_{real}$ to the controller 40.

The torque sensor 15 measures rotation torque based on a driver's steering operation of a steering wheel 2 as steering torque Ts, and output the measured steering torque to the controller 40. Note that the steering torque Ts measured by the torque sensor 15 is generated when the driver of the vehicle VE operates the steering wheel 2 to turn the steering wheel 2.

The detection unit 10 includes an object information sensor 16, an illuminance sensor 17, and a rain sensor 18.

The object information sensor 16 scans a predetermined range around the vehicle VE with probe waves, such as millimeter waves, laser waves, or the like, and receives echoes, i.e. reflection waves, from at least one object located around the vehicle VE based on the scanned probe waves, thus detecting object information about the at least one object. The object information includes, for example, the distance of the at least one object relative to the vehicle VE, the horizontal and/or vertical orientations of the at least one object relative to the vehicle VE, and the speed of the at least one object relative to the vehicle VE. For example, a millimeter-wave sensor or a laser radar, in other words, a lidar can be used as the object information sensor 16.

The illuminance sensor 17 measures ambient illuminance of the vehicle VE, and outputs, to the controller 40, ambient illuminance based on the detected ambient illuminance.

The rain sensor 18 measures the amount of rain drops on the front windshield of the vehicle VE, and outputs, to the controller 40, a rainfall amount based on the measured amount of rain drops.

The following also describes these sensors 16, 17, and 18 as environmental sensors. Such environmental sensors are each operative to measure or monitor an environmental parameter in front of the vehicle VE; this environmental parameter, which is also referred to as a travelling condition parameter, may affect the driver's visibility to the front.

One of the environmental sensors, which can be provided in the control system 1, is operative to measure, as the corresponding travelling condition parameter, a weather condition parameter representing a weather condition around the vehicle VE, such as a rain condition, a snow condition, a fog condition, a shine condition, a could condition, or a back-light condition.

Another one of the environmental sensors, which can be provided in the control system 1, is operative to measure, as the corresponding travelling condition parameter, a time-zone condition parameter indicative of a time-zone condition showing the time zone in which the vehicle VE is travelling.

A further one of the environmental sensors, which can be provided in the control system 1, is operative to measure, as the corresponding travelling condition parameter, a traffic condition parameter indicative of a traffic condition of the road in front of the vehicle.

For example, the object information sensor 16 is operative to monitor continuous points on at least one continuously extending object, such as a guardrail or a road marker, in the travelling direction of the vehicle; the monitored continuous points are located in a predetermined front region in front of the vehicle; the density of the monitored continuous points in the predetermined front region is used as a first travelling condition parameter.

The illumination sensor 17 is operative to measure, as second travelling condition parameter, the ambient illuminance.

The rain sensor 18 is operative to measure, as third travelling condition parameter, the rainfall amount.

The storage device 20 includes, for example, a hard disc drive, and stores for example road information 21. The road information 21 includes, for example, map data segments; the whole of the map data segments covers the areas in which the vehicle 100 can travel. The road information 21 also includes the shapes and locations of roads in the area, and the number of lanes in each of the roads. The road information 21 and the shapes of the roads will be described in detail later.

Figure 2:
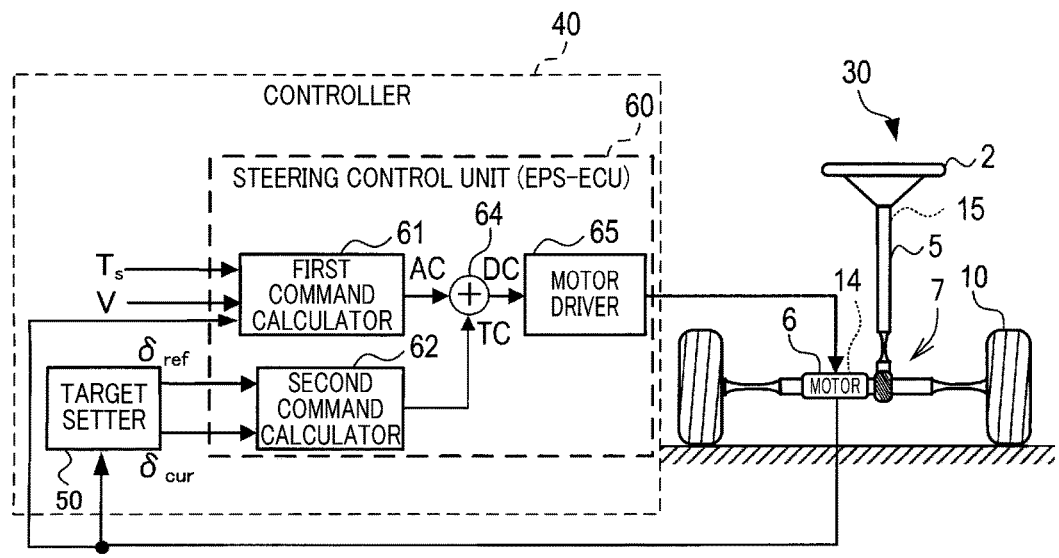
FIG. 2 is a circuit diagram schematically illustrating a steering mechanism illustrated in FIG. 1 and functional modules of a controller illustrated in FIG. 1.
Figure 3:
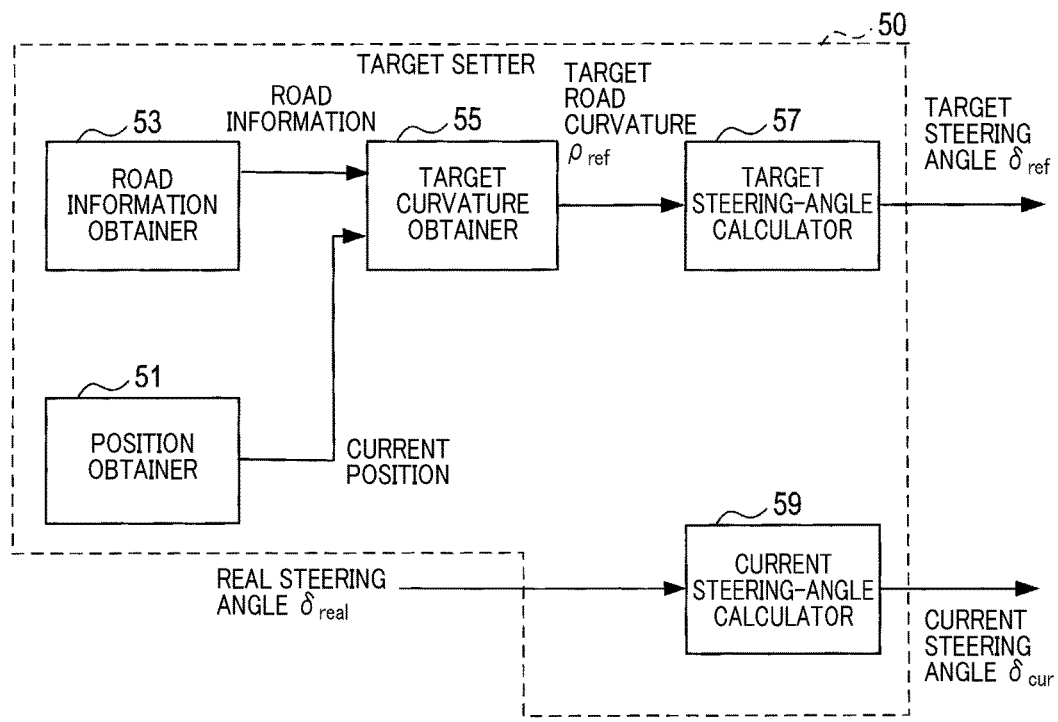
FIG. 3 is a block diagram schematically illustrating an example of the functional structure of a target setter illustrated in FIG. 2.

Referring to FIG. 2, the steering mechanism 30 includes the steering wheel 2, a steering-shaft assembly 5, the torque sensor 15 with a torsion bar, a motor 6, a gear mechanism, i.e. gear box, 7, tie rods 8, unillustrated knuckle arms, and wheels, for example, front wheels 19. The motor 6, gear mechanism 7, tie rods 8, and knuckle arms constitute a front axle of the vehicle VE. A rear axle of the vehicle VE has an identical configuration of the front axle.

The steering-shaft assembly 5 includes a steering shaft having opposing first and second ends, the torsion bar having opposing first and second ends, and an intermediate shaft having opposing first and second ends. The steering wheel 2 is mounted to the first end of the steering shaft, and the second end of the steering shaft is coupled to the first end of the torsion bar. The second end of the torsion bar is coupled to the first end of the intermediate shaft.

The torque sensor 15 measures the twist of the torsion bar based on a driver's steering operation of the steering wheel 2 and the steering shaft as the steering torque Ts.

The gear mechanism 7 includes a rod-shaped rack and a pinion. The pinion is mounted to the second end of the intermediate shaft, and is engaged with the rack. The rack is located in the horizontal direction, i.e. the width direction, of the vehicle VE, and has both ends. Each of the tie rods 8 has opposing first and second ends. The first end of each of the tie rods 8 is coupled to a corresponding one of both ends of the rack. One of the wheels 19 is mounted to the second end of one of the tie rods 8, and the other of the wheels 19 is also mounted to the second end of the other of the tie rods 8.

The motor 6 has an output shaft with a gear, and is mounted to the rack with the gear engaged with the rack.

The steering mechanism 30 for transferring the driver's steering effort of the steering shaft 2 to the wheels 19 will also be referred to as a steering system 100. For example, Japanese Patent Application Publication No. 2015-20604 discloses an example of such a steering system. The disclosure of this Japanese Patent Application Publication No. 2015-20604 is incorporated entirely herein by reference.

Driver's turning effort of the steering wheel 2 is transferred to the gear mechanism 7 via the steering shaft, torsion bar of the torque sensor, and the intermediate shaft. This causes rotation of the intermediate shaft based on the driver's turning effort of the steering wheel 2 to be converted by the pinion and the rack into the horizontal movement, i.e. right and left movement, of the rack. This horizontal movement of the rack results in horizontal movement of the tie rods, so that the wheels 19 are steered. The motor 6 is driven to assist the horizontal movement of the rack, thus assisting the turning of the steering shaft assembly 5.

The controller 40 is comprised of at least one normal microcomputer circuit including a CPU 41 and a memory device 42 includes, for example, at least one of semiconductor memories, such as a RAM, a ROM, and a flash memory. These semiconductor memories are non-transitory storage media.

For example, the CPU 41 can run one or more programs, i.e. program instructions, stored in the memory device 42, thus implementing various functions of the controller 40 as software operations. In other words, the CPU 41 can run programs stored in the memory device 42, thus performing one or more methods in accordance with the corresponding one or more programs. At least one of the various functions of the controller 40 can be implemented as a hardware electronic circuit. For example, the various functions of the controller 40 can be implemented by a combination of electronic circuits including digital circuits, which include many logic gates, analog circuits, digital/analog hybrid circuits, or hardware/software hybrid circuits.

In particular, the memory device 42 stores

1. First visibility-parameter relationship information I1 indicative of the relationship between the first travelling condition parameter, i.e. the density of the monitored continuous points measured by the object information sensor 16, and the driver's visibility to the front 2. Second visibility-parameter relationship information I2 indicative of the relationship between the second travelling condition parameter, i.e. the ambient illuminance, measured by the illumination sensor 17 and the driver's visibility to the front 3. Third visibility-parameter relationship information I3 indicative of the relationship between the third travelling condition parameter, i.e. the rainfall amount, measured by the rain sensor 18 and the driver's visibility to the front Referring to FIG. 2, the controller 40 functionally includes a target setter 50 and a steering control unit 60. For example, an electronic control unit (ECU) 60 for electric power steering (EPS) can be used as the steering control unit 60.

The target setter 50 detects the travelling lane on which the vehicle VE is travelling, and the current position of the vehicle VE on the travelling lane based on the GPS signals and the road information 21. Then, the target course setter 50 sets, based on the detected travelling lane and the current position of the vehicle VE, a target travelling course along which the vehicle VE should travel. In addition, the target setter 50 sets a controlled variable for travelling the vehicle VE along the target course in accordance with the speed of the vehicle VE and the range of visibility by a driver of the vehicle VE described later.

Specifically, the target setter 50 sets a target steering angle $\delta_{ref}$ as a target value of the steering angle of the vehicle VE; the target steering angle $\delta_{ref}$ is required for the vehicle VE to travel along the target course. The target setter 50 outputs, to the steering control unit 60, the target steering angle $\delta_{ref}$ and a current steering angle $\delta_{cur}$; the current steering angle $\delta_{cur}$ represents the steering angle of the vehicle VE at the current position, which is represented as $P_{cur}$, of the vehicle VE. How the target setter 50 obtains the current steering angle $\delta_{cur}$ will be described later.

Note that the target setter 50 can determine whether to set the target steering angle $\delta_{ref}$ depending on whether the level of reliability of GPS-based measurement in accordance with the intensity of each of the received GPS signals sent from the GPS satellites. Specifically, the target setter 50 can determine whether the level of reliability of determining the current position $P_{cur}$ of the vehicle VE based on the intensity of each of the GPS signals sent from the GPS satellites is equal to or higher than a predetermined reliability threshold level.

The target setter 50 includes a position obtainer 51, a road information obtainer 53, a target curvature obtainer 55, a target steering-angle calculator 57, and a current steering-angle setter 59. The CPU 41 runs at least one of the programs stored in the memory device 42 to implement the functional modules 51, 53, 55, 57, and 59 in the controller 40. The target setter 50 can include at least one of the functional modules 51, 53, 55, 57, and 59 as at least one hardware device or a hardware/software hybrid device.

The position obtainer 51 obtains, based on, for example, the GPS signals sent from the GPS sensor 12, the current position of the vehicle VE on the travelling lane of the travelling road.

The road information obtainer 53 obtains, from the storage device 20, the road information 21 including information about the travelling road, such as the shape of the travelling road extending in the travelling direction of the vehicle VE.

The information about a road on which the vehicle VE is travelling includes at least one of a value of the curvature at any position on the road, and a value of the radius of curvature at any position on the road, which represents the reciprocal of the curvature. The information about a road on which the vehicle VE is travelling can include information that enables the CPU 41 to calculate a value of the curvature at any position on the road, such as The road information 21 according to the first embodiment includes the curvature at any position on the travelling road of the vehicle VE as an example.

The target curvature obtainer 55 performs a target curvature calculating routine to calculate a target road curvature $\rho_{ref}$, and outputs the target road curvature $\rho_{ref}$ to the target steering-angle calculator 57.

That is, the target curvature calculating routine is configured to calculate the curvature at a target position $P_{ref}$ on the travelling road based on the current position $P_{cur}$ of the vehicle VE and the road information 21. The target position $P_{ref}$ represents a position on the travelling road, which is a predetermined target distance $d_{ref}$ away from the current position $P_{cur}$ of the vehicle VE along the travelling road. The first embodiment uses a visible distance $d_s$ of the driver of the vehicle VE described later and illustrated in FIG. 10 as the target distance $d_{ref}$. That is, the target road curvature $\rho_{ref}$ represents the curvature of the travelling road at the target position $P_{ref}$.

The target steering-angle calculator 57 calculates the target steering angle $\delta_{ref}$ based on the target road curvature $\rho_{ref}$, and outputs the target steering angle $\delta_{ref}$ to the steering control unit 60. The target steering angle $\delta_{ref}$ represents a steering angle of the vehicle VE at the target position $P_{ref}$. For example, the target steering-angle calculator 57 calculates the target steering angle $\delta_{ref}$ in accordance with the following equation (1):

$$\delta_{ref} = \rho_{ref} \times L \times \left\{ 1 - MV^2 \frac{K_f L_f - K_r L_r}{2LK_f K_r} \right\} \quad (1)$$

Where
1. M represents the weight of the vehicle VE, which is measured in kilogram
2. V represents the sped of the vehicle VE, which is measured in meters per second (m/s)
3. L represents the wheelbase of the vehicle VE, which is the distance between the front axle and the rear axle, and is measured in meters (m)
4. Lf represents the front wheelbase of the vehicle VE, which is the distance between the front axle and the center of mass of the vehicle VE, and is measured in meters
5. Lr represents the rear wheelbase of the vehicle VE, which is the distance between the rear axle and the center of mass of the vehicle VE, and is measured in meters
6. Kf represents predetermined front-wheel cornering power, which is measured in kilonewtons per degree (KN/deg)
7. Kr represents predetermined rear-wheel cornering power, which is measured in KN/deg Note that the target steering-angle calculator 57 can calculate the target steering angle $\delta_{ref}$ based on the target road curvature $\rho_{ref}$ without using the equation (1). Specifically, the target steering-angle calculator 57 can calculate the target steering angle $\delta_{ref}$ based on information, which is a map or a function, representing the relationship between the target steering angle $\delta_{ref}$ and the target road curvature $\rho_{Pref}$.

The current steering-angle setter 59 sets the real steering angle $\delta_{real}$ of the vehicle VE measured by the steering angle sensor 14 as the current steering angle $\delta_{cur}$ of the vehicle VE. Then, the current steering-angle setter 59 outputs, to the steering control unit 60, the current steering angle $\delta_{cur}$ of the vehicle VE; the current steering angle $\delta_{cur}$ represents, as described above, the steering angle of the vehicle VE at the current position $P_{cur}$ of the vehicle VE.

As illustrated in FIG. 2, the control unit 60 calculates a drive command value DC based on the target steering angle $\delta_{ref}$, the vehicle speed V, and the steering torque Ts. The drive command value DC is comprised of the sum of an assist command value AC and a tracking command value TC.

The assist command value AC represents a command current value required for the motor 6 to generate assist torque. The assist toque is to assist the driver's steering operation of the steering wheel 2 to thereby reduce driver's steering load, and cause the driver to have a first feeling depending on reaction force from the surface of the travelling road and a second feeling depending on the steering conditions.

The tracking command value TC represents a control value, i.e. a current command value, for the motor 6 to generate corrected torque in order to cause the vehicle VE to travel in the travelling lane. The corrected torque is to cause a measured value of a physical steering parameter, which is linked to the steering of the vehicle VE, to a target value of the physical steering parameter. The physical steering parameter represents the steering angle of the vehicle VE. That is, the target value of the physical steering parameter represents the target steering angle $\delta_{ref}$, and the measured value of the physical steering parameter represents the current steering angle $\delta_{cur}$. Note that the physical steering parameter can be another parameter depending on the rotational angle of the motor 6, the measured value of the steering angle sensor 14, or the real steering angle $\delta_{real}$ of the vehicle VE.

The steering control unit 60 applies a drive voltage Vd based on the drive command value DC to the motor 6, thus causing the motor 6 to generate the assist torque and the corrected torque. That is, the steering control unit 60 controls the motor 6 based on the drive voltage Vd to control the steering system 100, thus controlling the steering characteristics of the vehicle VE.

For example, referring to FIG. 2, the steering control unit 60 includes a first command calculator 61, a second command calculator 62, an adder 64, and a motor driver 65. The CPU 41 runs at least one of the programs stored in the memory device 42 to implement the functional modules 61, 62, 64, and 65 in the controller 40. The steering control unit 60 can include at least one of the functional modules 61, 62, 64, and 65 as at least one hardware device or a hardware/software hybrid device.

The first command calculator 61 calculates the assist command value AC as a function of the steering torque Ts, the real steering angle $\delta_{real}$, the vehicle speed V, and the steering angular velocity, and outputs the assist command value AC to the adder 64. The first command calculator 61 can calculate the assist command value AC based on information, which is a map or a function, representing the relationship between the assist command value AC, the steering torque Ts, the real steering angle $\delta_{real}$, the vehicle speed V, and the steering angular velocity.

Figure 4:
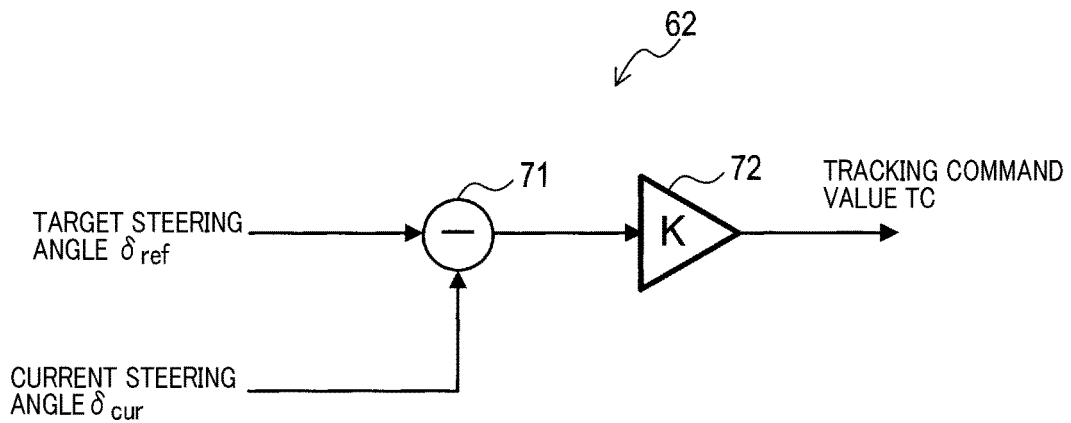
FIG. 4 is a diagram schematically illustrating an example of the functional structure of a second command calculator illustrated in FIG. 2.

Referring to FIG. 4, the second command calculator 62 includes a deviation calculator 71 and a determiner 72. The deviation calculator 71 calculates the deviation of the current steering angle $\delta_{cur}$ from the target steering angle $\delta_{ref}$, and outputs the deviation ($\delta_{ref}-\delta_{cur}$) to the determiner 72.

The determiner 72 reads a predetermined tracking gain, which has been stored in the memory device 42, and multiplies the deviation ($\delta_{ref}-\delta_{cur}$) by the tracking gain, thus determining the tracking command value TC. Then, the determiner 72 outputs the tracking command value TC to the adder 64.

Note that the determiner 72 can determine, as the tracking command value TC, the sum of 1. The product of a predetermined proportional gain and the deviation ($\delta_{ref}$-$\delta_{cur}$)
2. The product of a predetermined integral gain and the integral value of the deviation ($\delta_{ref}$-$\delta_{cur}$)
3. The product of a predetermined derivative gain and a derivative value of the deviation ($\delta_{ref}$-$\delta_{cur}$)

The steering control unit 60 can output the tracking command value TC to the adder 64 only when the level of reliability of determining the current position $P_{cur}$ of the vehicle VE based on the GPS signals sent from the GPS satellites is equal to or higher than the predetermined reliability threshold in accordance with an instruction sent from the target setter 50. The steering control unit 60 cannot output the tracking command value TC to the adder 64, i.e. output the tracking command value TC having the signal level of zero to the adder 64, when the level of reliability of determining the current position $P_{cur}$ of the vehicle VE based on the GPS signals sent from the GPS satellites is lower the predetermined reliability threshold.

The adder 64 adds the tracking command value TC to the assist command value AC to calculate the drive command value DC, thus outputting the drive command value DC to the motor driver 65.

The motor driver 65 applies the drive voltage Vd based on the drive command value DC to the motor 6, thus driving the motor 6.

Specifically, the motor driver 65 generates, based on the drive command value DC, the drive voltage Vd that causes the motor 6 to apply torque based on the drive command value DC to the steering shaft assembly 5. Specifically, the motor driver 65 performs feedback control of the drive voltage Vd to cause a value of current Im flowing in the motor 6 based on the drive voltage Vd to follow a target current value defined by the drive command value DC, thus applying suitable torque to the steering shaft assembly 5. Such feedback control is known in the art. For example, Japanese Patent Application Publication No. 2013-52793 discloses an example of such feedback control. The disclosure of this Japanese Patent Application Publication No. 2013-52793 is incorporated entirely herein by reference.

The first command calculator 61 calculates the assist command value AC as a function of the steering torque Ts, the real steering angle $\delta_{real}$, the vehicle speed V, and the steering angular velocity. The first command calculator 61 can use the rotational angle of the motor 6 as the real steering angle $\delta_{real}$, and the rotational angular velocity of the motor 6 as the steering angular velocity.

For example, the first command calculator 61 calculates, based on the steering torque Ts and the vehicle speed V, a fundamental assist command value for causing the driver to have the first feeling depending on the reaction force from the surface of the travelling road. Then, the first command calculator 61 determines the fundamental assist command value as the assist command value AC.

As another example, the first command calculator 61 calculates, based on the steering torque Ts and the rotational angular velocity of the motor 6, an assist correction value required for the driver to have the second feeling depending on the steering conditions. Then, the first command calculator 61 adds the assist correction value to the fundamental assist command value, thus generating the assist command value AC.

Note that the first command calculator 61 can use one of known methods for calculating the assist command value AC.

Figure 6:
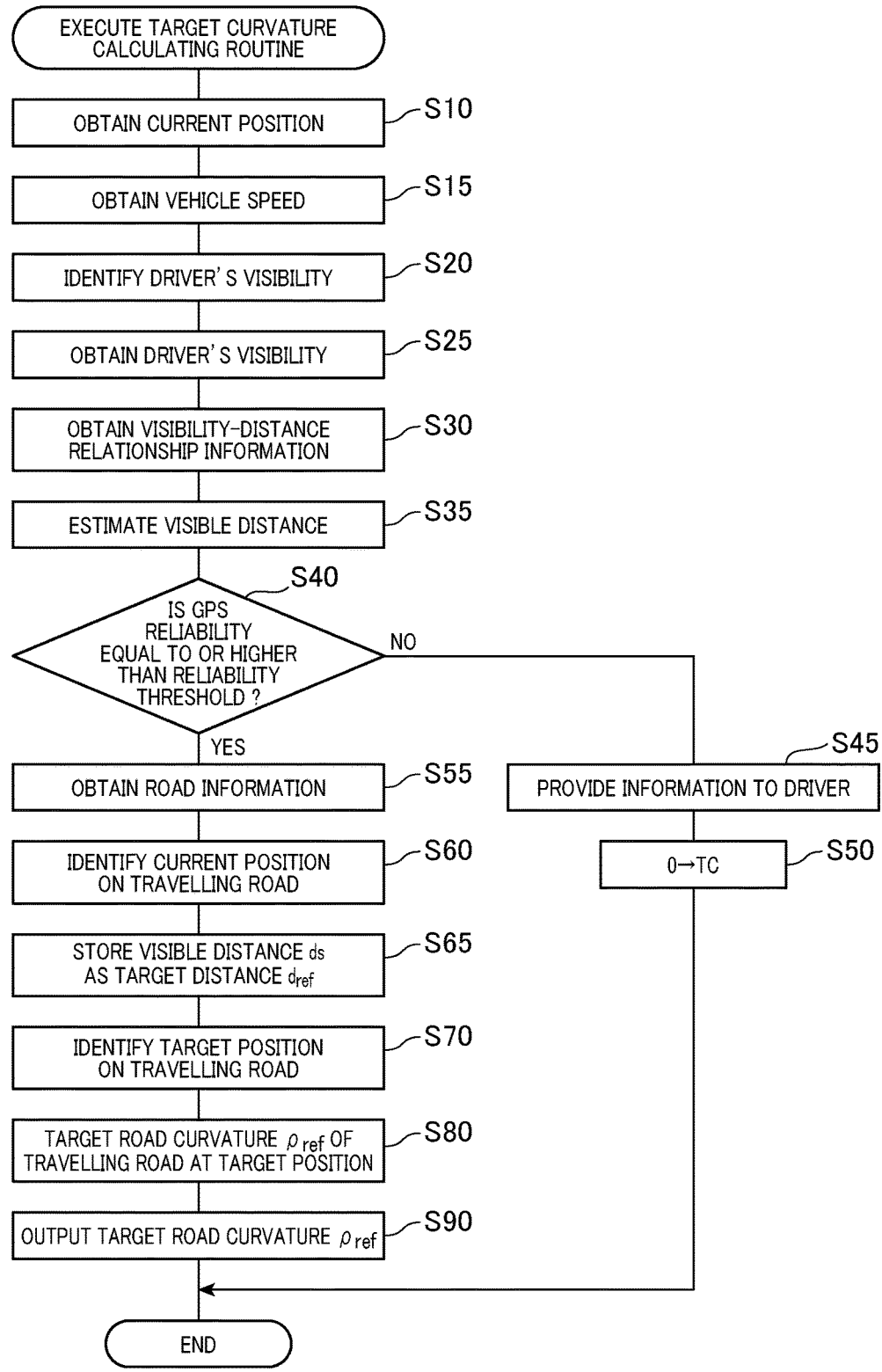
FIG. 6 is a flowchart schematically illustrating an example of a target curvature calculating routine executed by the CPU of the controller.

Next, the following describes the target curvature calculating routine carried out by the target curvature obtainer 55, i.e. the CPU 41, with reference to FIG. 6. The target curvature obtainer 55 can perform the target curvature calculating routine every predetermined period, or can perform the target curvature calculating routine each time the vehicle VE travels a predetermined distance.

Figure 5:
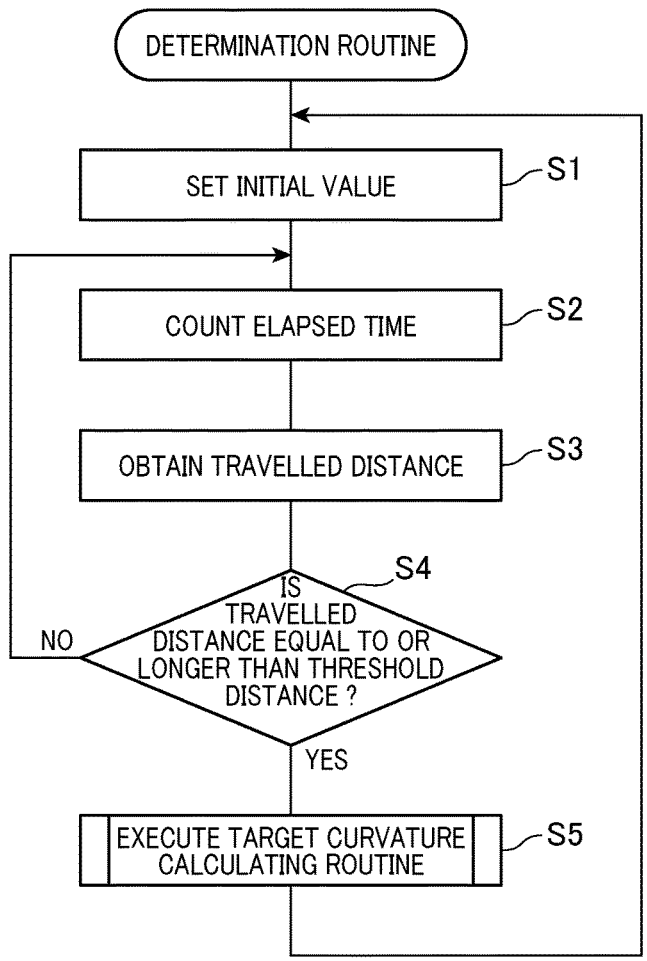
FIG. 5 is a flowchart schematically illustrating an example of a determination routine executed by a CPU of the controller.

In particular, the target curvature obtainer 55 according to the first embodiment is configured to perform a determination routine that enables the curvature calculating routine to be carried out each time the vehicle VE travels a predetermined threshold distance with reference to FIG. 5. For example, the target curvature obtainer 55 starts the determination routine when the controller 40 is powered.

When starting the determination routine, the target curvature obtainer 55 sets each of a first variable indicative of an elapsed time and a second variable indicative of a traveled distance to an initial value of zero in step S1. Note that the elapsed time represents the time that has elapsed since the predetermined point, such as the center of gravity, of the vehicle VE was located at a reference position stored in the memory device 42.

In step S1, the target curvature obtainer 55 obtains the current position $P_{cur}$ of the vehicle VE from the GPS sensor 12, and stores the current position $P_{cur}$ of the vehicle VE in the memory device 42 as the reference position of the vehicle VE.

In addition, note that the traveled distance represents the distance that the predetermined point of the vehicle VE has traveled since the reference position. The reference position is the current position of the predetermined point of the vehicle VE.

Specifically, the target curvature obtainer 55 or another functional module of the CPU 41 counts the elapsed time, and the target curvature obtainer 55 obtains the elapsed time as the value of the first variable in step S2. The target curvature obtainer 55 or another functional module of the CPU 41 measures or calculates the travelled distance, and the target curvature obtainer 55 obtains the travelled distance as the value of the second variable in step S3. For example, the target curvature obtainer 55 multiplies the elapsed time obtained in step S2 by the vehicle speed V obtained from the vehicle speed sensor 13, thus obtaining the travelled distance.

Then, the target curvature obtainer 55 determines whether the travelled distance as the value of the second variable has reached the predetermined threshold distance in step S4. In other words, the target curvature obtainer 55 determines whether the travelled distance as the value of the second variable is equal to or longer than the predetermined threshold distance in step S4.

Upon determining that the travelled distance as the value of the second variable has not reached the predetermined threshold distance (NO in step S4), the target curvature obtainer 55 returns to the step S2, and repeatedly performs the operations in steps S2 to S4 until the travelled distance updated in step S3 has reached the predetermined threshold distance.

Specifically, upon determining that the travelled distance as the value of the second variable has reached the predetermined threshold distance (YES in step S4), the target curvature obtainer 55 performs the target curvature calculating routine as a subroutine in step S5 of the determination routine. After completion of the target curvature calculating routine described later, the target curvature obtainer 55 repeatedly performs the determination routine from step S1.

Note that the target curvature obtainer 55 can perform any one of known routines to perform the curvature calculating routine every predetermined period.

Next, the following describes the curvature calculating routine with reference to FIG. 6.

When starting the curvature calculating routine in response to, for example, the affirmative determination in step S4, the target curvature obtainer 55 obtains the current position $P_{cur}$ from the GPS sensor 12 in step S10.

In step S15, the target curvature obtainer 55 obtains the vehicle speed V from the vehicle speed sensor 13.

In step S20, the target curvature obtainer 55 obtains, from at least one of the environmental sensors 16 to 18, i.e. at least one of the object information sensor 16, the illuminance sensor 17, and the rain sensor 18, the corresponding at least one of the first, second, and third travelling condition parameters. In step S20, the target curvature obtainer 55 also obtains, from the memory device 42, the corresponding at least one of the first visibility-parameter relationship information I1, the second visibility-parameter relationship information I2, and the third visibility-parameter relationship information I3.

Then, the target curvature obtainer 55 identifies a value of the driver's visibility to the front based on the at least one of the first, second, and third travelling condition parameters and the corresponding at least one of the first visibility-parameter relationship information I1, the second visibility-parameter relationship information I2, and the third visibility-parameter relationship information I3 in step S20.

The driver's visibility to the front represents a numerical level of the visibility of a driver of the vehicle VE to the front. The front represents the travelling direction of the vehicle VE. The visibility of a driver of any vehicle to the front will also be referred to as a driver's front visibility.

The driver's front visibility can be expressed by any numerical value. The driver's front visibility according to the first embodiment is a numerical value within the range from 0 to 1 inclusive.

When the object information sensor 16 is installed in the control system 1 as one of the environmental sensors, the target curvature obtainer 55 obtains, from the object information sensor 16, the monitored continuous points in the predetermined front region. Next, the target curvature obtainer 55 calculates the density of the monitored continuous points, i.e. calculates how the monitored continuous points are dense as the first travelling condition parameter. Then, the target curvature obtainer 55 identifies, in the first visibility-parameter relationship information I1, a numerical level of the driver's front visibility of the vehicle VE; the extracted numerical level of the driver's front visibility off the vehicle VE.

Figure 7:
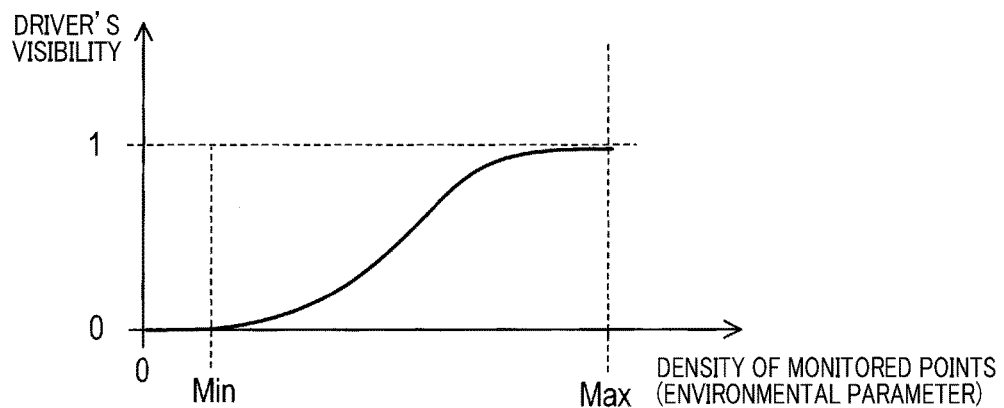
FIG. 7 is a graph schematically illustrating first visibility-parameter relationship information according to the first embodiment.

For example, FIG. 7 illustrates that the first visibility-parameter relationship information I1 shows change of the driver's front visibility of the vehicle VE as a function of the density of the monitored points in the predetermined front region of the vehicle VE. The function shows that 1. The maximum level of the driver's front visibility, which is represented as 1, matches with the maximum density of the monitored points in the predetermined front region of the vehicle VE 2. The minimum level of the driver's front visibility, which is represented as 0, matches with the minimum density of the monitored points in the predetermined front region of the vehicle VE A high value of the driver's front visibility of the vehicle VE shows that 1. At least one continuously extending object, such as a guardrail or a road marker, in the travelling direction of the vehicle VE is located in the predetermined front region of the vehicle VE 2. The at least one continuously extending object in the travelling direction of the vehicle VE is measured by the object information sensor 16

Note that the road marker includes lane marking lines, such as predetermined-colored lines, that define travelling lanes on a road.

The environmental condition in which at least one continuously extending object in the travelling direction of the vehicle VE is measured by the object information sensor 16 represents an environmental condition in front of the vehicle VE, which no other vehicles are located in front of the vehicle VE, i.e. represents an environmental condition in front of the vehicle VE, which there are no traffic jams in front of the vehicle VE. That is, the object information sensor 16 is used as an environmental sensor for measuring the traffic condition of the road in front of the vehicle VE.

As illustrated in FIG. 7, the driver's front visibility of the vehicle VE, which is as a function of the density of the monitored points in the predetermined front region of the vehicle VE, increases as the density of the monitored points in the predetermined front region of the vehicle VE increases. That is, the driver's front visibility of the vehicle VE can increase as the driver's forward visibility becomes better.

In step S25 following the operation in step S20, the target curvature obtainer 55 extracts, from the first visibility-parameter relationship information I1, the numerical level of the driver's front visibility of the vehicle VE identified in step S20.

Note that a structure installed in the control system 1 can identify the numerical level of the driver's front visibility of the vehicle VE in the same manner as the operations in steps S10 to S20. At that time, the target curvature calculator 25 can be configured not to identify the numerical level of the driver's front visibility of the vehicle VE, and obtain the numerical level of the driver's front visibility of the vehicle VE from the structure.

Figure 8:
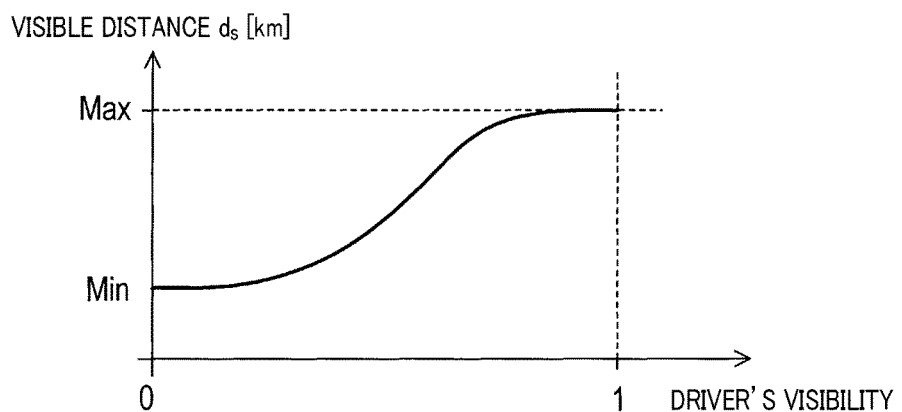
FIG. 8 is a graph schematically illustrating visibility-distance relationship information according to the first embodiment.

In particular, the memory device 42 can store visibility-distance relationship information I4 as illustrated in FIG. 8. The visibility-distance relationship information I4 shows the relationship between the visible distance $d_s$ of the driver of the vehicle VE, which is expressed in kilometers (km), and the driver's front visibility of the vehicle VE. For example, the visibility-distance relationship information I4 shows change of the visible distance $d_s$ of the driver of the vehicle VE as a function of the driver's front visibility of the vehicle VE.

The visible distance $d_s$ of the driver of the vehicle VE represents the maximum distance, which is visibly recognizable by the driver of the vehicle VE from the current location.

For example, as illustrated in FIG. 8, the visibility-distance relationship information I4 is configured such that the visible distance $d_s$ of the driver of the vehicle VE monotonically increases from its minimum value to its maximum value as the driver's front visibility of the vehicle VE increases from 0 to 1. That is, the target curvature obtainer 55 can obtain, from the memory device 42, the visibility-distance relationship information 14 in step S30.

Figure 9:
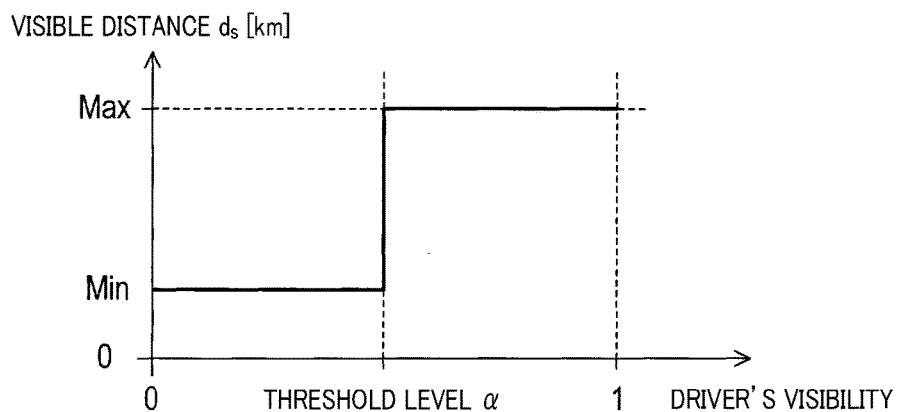
FIG. 9 is a graph schematically illustrating a modification of the visibility-distance relationship information according to the first embodiment.

The visibility-distance relationship information I4 can also be configured such that the visible distance $d_s$ of the driver of the vehicle VE rises in pulse or step from its minimum value to its maximum value when the driver's front visibility of the vehicle VE reaches a predetermined numerical threshold level a as illustrated in FIG. 9. The visibility-distance relationship information I4 can further be configured such that the visible distance $d_s$ of the driver of the vehicle VE rises in pulse or step from its minimum value to its maximum value when the driver's front visibility of the vehicle VE reaches at least one of predetermined numerical threshold levels.

In step S35, the target curvature obtainer 55 extracts, from, for example, the visibility-distance relationship information I4, a value of the visible distance $d_s$ of the driver of the vehicle VE corresponding to the numerical level of the driver's front visibility of the vehicle VE obtained in step S25, thus estimating the value of the visible distance $d_s$ of the driver of the vehicle VE in step S35.

In step S40, the target curvature obtainer 55 calculates the level of reliability of the GPS-based measurement in accordance with the intensity of each of the received GPS signals, and determines whether the level of reliability of the GPS-based measurement, which is also referred to simply as GPS reliability, is equal to or higher than the predetermined reliability threshold.

For example, reliability-intensity relationship information I5 indicative of the relationship between the level of reliability of the GPS-based measurement and the intensity of each of the GPS signals can be stored in the memory device 42. For example, the reliability-intensity relationship information I5 shows change of the level of reliability of the GPS-based measurement as a function of the intensity of each of the GPS signals.

The reliability-intensity relationship information I5 can be configured such that the level of reliability of the GPS-based measurement increases with an increase of the intensity of each of the GPS signals. The reliability-intensity relationship information I5 can be configured such that the level of reliability of the GPS-based measurement has 0 as its minimum value, and has 1 as its maximum value. The threshold reliability level can be set to, for example, 0.5, and previously stored in the memory device 42.

That is, the target curvature obtainer 55 can calculate, based on the reliability-intensity relationship information I5, a level of reliability of the GPS-based measurement using the intensity of each of the GPS signals.

When it is determined that the level of reliability of the GPS-based measurement is lower than the predetermined reliability threshold (NO in step S40), the curvature calculating routine proceeds to step S45. Otherwise, when it is determined that the level of reliability of the GPS-based measurement is equal to or higher than the predetermined reliability threshold (YES in step S40), the curvature calculating routine proceeds to step S55.

In step S45, the target curvature obtainer 55 includes, for example, an audio output unit and/or a display, and provides, to a driver of the vehicle VE, visible and/or audible information representing that driving assist, i.e. cruising assist, for the driver of the vehicle VE based on the driver's front visibility of the vehicle VE is cancelled using the audio output unit and/or display. Following the operation in step S45, the target curvature obtainer 55 resets the tracking command value TC to zero in step S50, and terminates the curvature calculating routine.

In contrast, when it is determined that the level of reliability of the GPS-based measurement is equal to or higher than the predetermined reliability threshold (YES in step S40), the target curvature obtainer 55 performs the following operations from step S55 to S90 to perform driving assist for the driver of the vehicle VE based on the driver's front visibility of the vehicle VE.

Specifically, the target curvature obtainer 55 obtains, from the storage device 20, the road information 21 via the road information obtainer 53 in step S55. Next, the target curvature obtainer 55 identifies the current position $P_{cur}$ of the vehicle VE on the travelling road on the corresponding map segment on which the vehicle VE is travelling using one of known identifying method, such as a map matching method in step S60. Specifically, the target curvature obtainer 55 identifies the coordinates, i.e. the latitude and longitude, of the current position $P_{cur}$ of the vehicle VE on the travelling road in step S60.

Subsequently, the target curvature obtainer 55 stores, in the memory device 42, the visible distance $d_s$ of the driver of the vehicle VE estimated in step S35 as the target distance $d_{ref}$ in step S65.

Thereafter, the target curvature obtainer 55 identifies the target position $P_{ref}$ on the travelling road on the corresponding map segment based on the road information 21 in step S70. As described above, the target position $P_{ref}$ represents the position on the travelling road, which is the target distance $d_{ref}$ away from the current position $P_{cur}$ of the vehicle VE along the travelling road.

Figure 10:
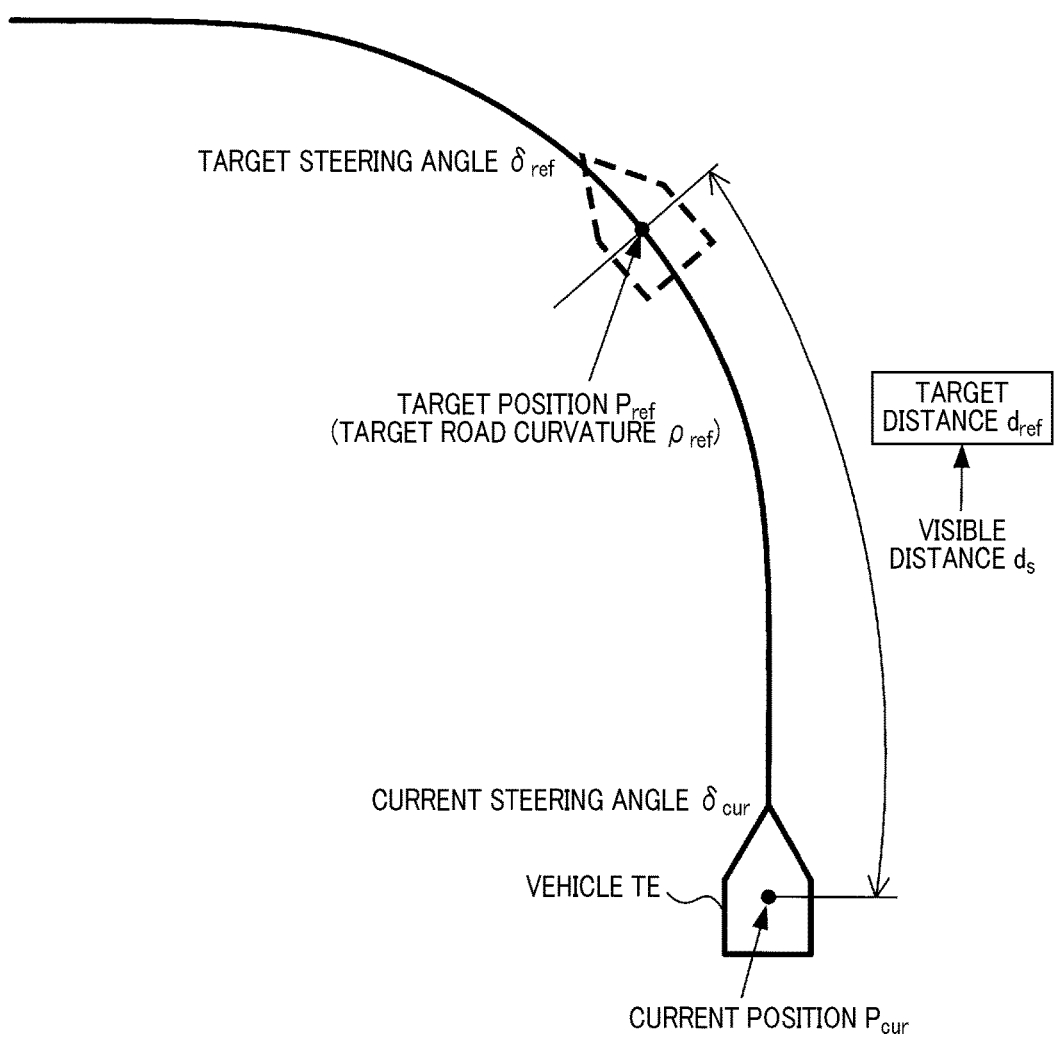
FIG. 10 is a diagram schematically illustrating a target distance and a visible distance according to the first embodiment.

In step S70, as illustrated in FIG. 10, the target curvature obtainer 55 uses the visible distance $d_s$ as the target distance $d_{ref}$ to identify the coordinates, i.e. the latitude and longitude, of the target position $P_{ref}$ on the travelling road defined based on the road information 21; the coordinates of the target position $\rho_{ref}$ is the visible distance $d_s$ away from the current position $P_{cur}$ of the vehicle VE along the travelling road as the target position $P_{ref}$.

Following the operation in step S70, the target curvature obtainer 55 obtains the curvature of the travelling road at the target position $\rho_{ref}$ as the target road curvature $\rho_{ref}$ in step S80. Then, the target curvature obtainer 55 outputs the target road curvature $\rho_{ref}$ to the target steering-angle calculator 57 in step S90, and thereafter, terminates the curvature calculating routine.

Specifically, the controller 40 is operative to

1. Set the real steering angle $\delta_{real}$ of the vehicle VE at the current position $P_{cur}$ of the vehicle VE as the current steering angle $\delta_{cur}$ of the vehicle VE 2. Calculate, based on the target road curvature $\rho_{ref}$ obtained from the road information 21, the target steering angle $\delta_{ref}$ at the target position $P_{ref}$; the target position $P_{ref}$ is defined based on the visible distance $d_s$ of the driver of the vehicle VE 3. Cause the motor 6 to generate and output corrected torque to reduce the deviation between the current steering angle $\delta_{cur}$ and the target steering angle $\delta_{ref}$ This configuration enables the corrected torque to match the current steering angle $\delta_{cur}$ with the target steering angle $\delta_{ref}$, making it possible to guide the driver to cruise the vehicle VE along the shape, i.e. the curvature of the travelling road.

Note that, in the specification, an expression "matching A with B" represents not only "causing A to be strictly in agreement with B but also "controlling A in accordance with B".

As described above, the controller 40 according to the first embodiment, which controls the steering of the vehicle VE, includes the position obtainer 51, road information obtainer 53, target curvature obtainer 55, target steering-angle calculator 57, current steering-angle calculator 59, and second command calculator 62.

The position obtainer 51 obtains, based on, for example, the GPS signals sent from the GPS sensor 12, the current position of the vehicle VE on the travelling lane of the travelling road.

The road information obtainer 53 obtains, from the storage device 20, the road information 21 including information about the travelling road, such as the shape of the travelling road extending in the travelling direction of the vehicle VE.

The target curvature obtainer 55 performs the target curvature calculating routine to calculate the target road curvature $\rho_{ref}$ at the target position $P_{ref}$ on the travelling road based on the current position $P_{cur}$ of the vehicle VE and the road information 21. The target position $P_{ref}$ represents the position on the travelling road, which is the predetermined target distance $d_{ref}$ away from the current position $P_{cur}$ of the vehicle VE along the travelling road.

The target steering-angle calculator 57 calculates the target steering angle $\delta_{ref}$ based on the target road curvature $\rho_{ref}$; the target steering angle $\delta_{ref}$ represents a steering angle of the vehicle VE at the target position $P_{ref}$.

The current steering-angle calculator 59 obtains the current steering angle $\delta_{cur}$ of the vehicle VE at the current position $P_{cur}$ of the vehicle VE.

The second command calculator 62 generates the tracking command value TC for causing the motor 6 to rotate such that the current steering angle $\delta_{cur}$ of the vehicle VE that is reaching the target position $P_{ref}$ matches with the target steering angle $\delta_{ref}$.

To sum up, the controller 40 is configured to calculate the target steering angle $\delta_{ref}$ based on the target road curvature $\rho_{ref}$ that represents the curvature of the travelling road at the target position $P_{ref}$; the target position $\rho_{ref}$ is estimated based on the current position $P_{cur}$ of the vehicle VE and the road information 21.

This configuration enables the vehicle VE to travel along the shape of the travelling road in accordance with the target steering angle $\delta_{ref}$ without being effected from ambient environment, i.e. traffic conditions, in front of the vehicle VE.

In particular, the target curvature obtainer 55 can obtain the driver's visibility to the front, which is represented as a numerical level of the visibility of a driver of the vehicle VE to the front. Then, the target curvature obtainer 55 can estimate the visible distance $d_s$ of the driver of the vehicle VE from the current location of the vehicle VE in accordance with the driver's visibility to the front. The target curvature obtainer 55 can also use the visible distance $d_s$ as the target distance $d_{ref}$.

This configuration uses, as the target distance $d_{ref}$, the visible distance $d_s$ that changes depending on change of the driver's visibility to the front. This enables control of the steering angle of the vehicle VE at a variable far position relative to the vehicle VE; the driver of the vehicle VE can visibly recognize the far position. This results in steering control of the vehicle VE more matching with driver's visual feeling than control of the steering angle of the vehicle VE at a fixed near position relative to the vehicle VE. This enables the driver of the vehicle VE to travel without causing discomfort to the driver.

Experienced drivers have a higher probability of operating a steering wheel while viewing a farther point than inexperienced drivers do. That is, Such an experienced driver has a tendency to start an operation of a steering wheel based on the shape of his/her visible far part of the travelling road until his/her vehicle reaches the far part of the travelling road. Such a driving operation of the steering wheel will be referred to as an anticipatory steering operation, i.e. a far-view steering operation.

The controller 40 according to the first embodiment is configured to start, before reaching the vehicle VE to the target position $P_{ref}$, controlling the motor 6 to match the current steering angle $\delta_{cur}$ of the vehicle VE with the target steering angle $\delta_{ref}$ that is obtained based on the target road curvature $\rho_{ref}$; the target steering angle $\delta_{ref}$ represents a steering angle of the vehicle VE at the target position $P_{ref}$, and the target position $P_{ref}$ represents the position on the travelling road, which is the predetermined target distance $d_{ref}$ away from the current position $P_{cur}$ of the vehicle VE along the travelling road.

This enables even an inexperienced driver to perform an operation of the steering wheel 2, which is similar to the anticipatory steering operation.

Additionally, the target curvature obtainer 55 can be configured to obtain a travelled distance of the vehicle VE; the travelled distance represents the distance that the vehicle VE has travelled since the current position $P_{cur}$ of the vehicle VE. At that time, the second command calculator 62 can be configured to generate the tracking command value TC for causing the motor 6 to rotate such that the deviation of the current steering angle $\delta_{cur}$ from the target steering angle $\delta_{ref}$ decreases as the travelled distance increases.

This configuration enables the deviation of the current steering angle $\delta_{cur}$ from the target steering angle $\delta_{ref}$ to gradually decrease before the vehicle VE reaches the target position $P_{ref}$. This prevents execution of control to increase the amount of change of the steering angle when the vehicle VE travels at the entrance of a curve if the entrance of the curve is the target position $P_{ref}$; this control may result in the driver of the vehicle VE having uncomfortable feeling.

The driver's front visibility of the vehicle VE can increase more as the driver's forward visibility becomes better. The target curvature obtainer 55 can obtain, from the memory device 42, the visibility-distance relationship information I4 configured such that the visible distance $d_s$ of the driver of the vehicle VE monotonically increases as the driver's front visibility of the vehicle VE increases. The target curvature obtainer 55 can extract, from the visibility-distance relationship information I4, a value of the visible distance $d_s$ of the driver of the vehicle VE corresponding to the numerical level of the driver's front visibility of the vehicle VE, thus estimating the value of the visible distance $d_s$ of the driver of the vehicle VE.

This configuration enables the visible distance $d_s$ of the driver of the vehicle VE to be estimated such that the visible distance $d_s$ of the driver of the vehicle VE increases as the driver's front visibility of the vehicle VE increases. This configuration therefore results in the target position $P_{ref}$ being set to be farther for the better front sight than the target position for the worse front sight. This makes it possible to control the steering angle of the vehicle VE to match with driver's visual feeling.

Second Embodiment

Figure 11:
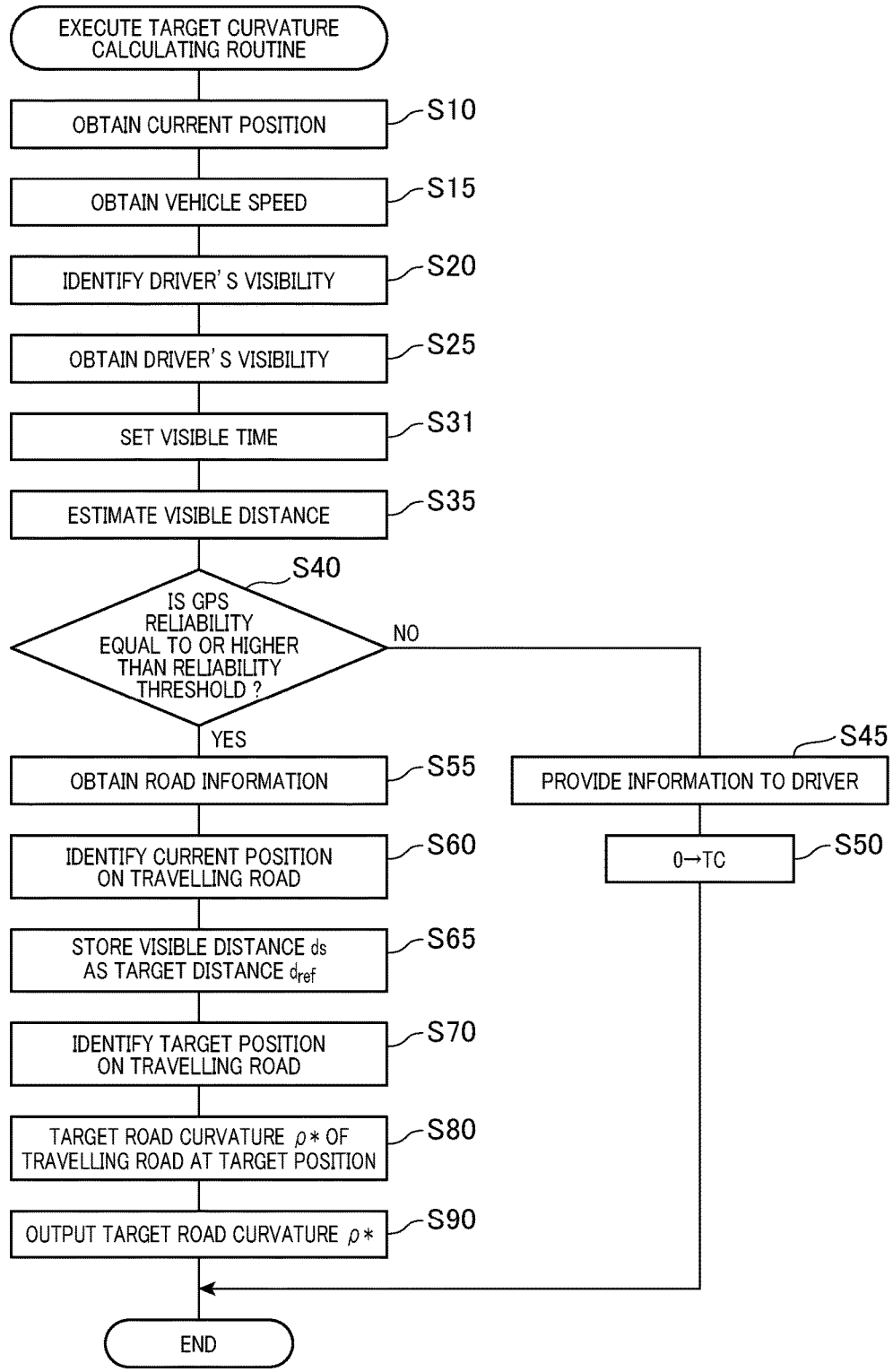
FIG. 11 is a flowchart schematically illustrating a target curvature calculating routine executed by the CPU of the controller according to the second embodiment of the present disclosure.
Figure 12:
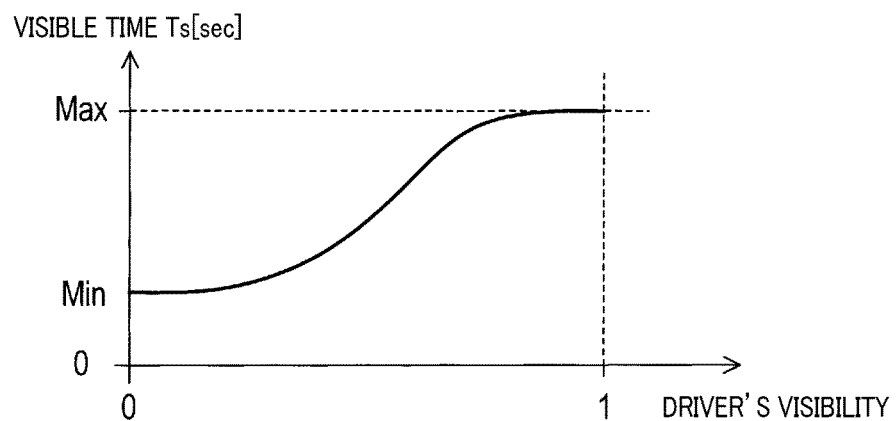
FIG. 12 is a graph schematically illustrating relationship information indicative of the relationship between visible time and a driver's front visibility of a vehicle according to the second embodiment.

The following describes the second embodiment of the present disclosure with reference to FIGS. 11 and 12. The second embodiment differs from the first embodiment in the following points. So, the following mainly describes the different points, and omits or simplifies descriptions of like parts between the first and second embodiments, to which identical or like reference characters are assigned, thus eliminating redundant description.

The controller 40 according to the first embodiment is configured to estimate the visible distance $d_s$ based on the driver's front visibility of the vehicle VE and the visibility-distance relationship information I4.

In contrast, the controller 40 according to the second embodiment is configured to estimate the visible distance $d_s$ based on a visible time Ts determined based on the driver's front visibility of the vehicle VE.

Next, the following describes a target curvature calculating routine carried out by the target curvature obtainer 55, i.e. the CPU 41, with reference to FIG. 11. The target curvature obtainer 55 performs the operation in step S31 illustrated in FIG. 11 in place of the operation in step S30 illustrated in FIG. 6. Because the operations in steps S10 to S25 and the operations in steps S40 to S90 illustrated in FIG. 11 are identical to the operations in steps S10 to S25 and the operations in steps S40 to S90 illustrated in FIG. 6, the descriptions of them are omitted.

Following the operation in step S25, the target curvature obtainer 55 sets the visible time Ts representing time depending on the driver's front visibility of the vehicle VE.

For example, relationship information I6 indicative of the relationship between the visible time Ts and the driver's front visibility of the vehicle VE is stored in the memory device 42. For example, the relationship information I6 shows change of the visible time Ts as a function of the driver's front visibility of the vehicle VE. The relationship information I6 can be configured such that the value of the visible time Ts becomes minimum when the driver's front visibility of the vehicle VE is 0, and the relationship information I6 can be configured such that the value of the visible time Ts becomes maximum when the driver's front visibility of the vehicle VE is 1 (see FIG. 12).

That is, the visible time Ts is a function of the driver's front visibility of the vehicle VE, and is configured such that the visible time Ts increases with an increase of the driver's front visibility of the vehicle VE. Specifically, the target curvature obtainer 55 extracts, from the relationship information I6, a value of the visible time Ts corresponding to the numerical level of the driver's front visibility of the vehicle VE in step S31.

In step S35, the target curvature obtainer 55 calculates the product of the visible time Ts and the vehicle speed V to thereby calculate a value of the visible distance $d_s$ of the driver of the vehicle VE corresponding to the numerical level of the driver's front visibility of the vehicle VE obtained in step S25. Then, the target curvature obtainer 55 stores, in the memory device 42, the visible distance $d_s$ of the driver of the vehicle VE in step S35. After completion of the operation in step S35, the target curvature obtainer 55 performs the operations in steps S40 to S90 in the same approach as the operations in steps S40 to S90 illustrated in FIG. 6.

The controller 40 according to the second embodiment achieves the following advantageous effect in addition to the advantageous effects achieved by the controller 40 according to the first embodiment.

Specifically, the target curvature obtainer 55 calculates the product of the visible time Ts and the vehicle speed V to thereby calculate a value of the visible distance $d_s$ of the driver of the vehicle VE corresponding to the numerical level of the driver's front visibility of the vehicle VE.

This enables the visible distance $d_s$ of the driver of the vehicle VE to be variably determined depending on the product of the visible time Ts and the vehicle speed V. This makes it possible to set the target position $P_{ref}$ such that 1. The lower the vehicle speed V is, the closer the target position $P_{ref}$ to the vehicle VE is under a predetermined environmental condition where the driver's front visibility of the vehicle VE is set to a predetermined level 2. The higher the vehicle speed V is, the farther the target position $P_{ref}$ to the vehicle VE is under the same environmental condition where the driver's front visibility of the vehicle VE is set to the predetermined level For example, the target curvature obtainer 55 according to the second embodiment can determine the visible distance $d_s$ based on the driver's front visibility of the vehicle VE and the visibility-distance relationship information I4, thus determining the target position $P_{ref}$ based on the visible distance $d_s$ if the vehicle VE is travelling on a local road.

In contrast, the target curvature obtainer 55 according to the second embodiment can determine the visible distance $d_s$ based on the visible time Ts and the driver's front visibility of the vehicle VE, thus determining the target position $P_{ref}$ if the vehicle VE is travelling on a road, such as a highway, at a speed faster than predetermined speed limits of local roads.

This results in steering control of the vehicle VE more matching with driver's visual feeling than control of the steering angle of the vehicle VE at a fixed near position relative to the vehicle VE. This enables the controller 40 to more properly control the steering of the vehicle VE while the driver has less uncomfortable feeling.

The speed V of the vehicle VE, i.e. the vehicle speed V, according to the second embodiment represents the speed of the vehicle VE at the current position $P_{cur}$, but the present disclosure is not limited thereto. Specifically, any vehicle speed can be used as value of the vehicle speed in step S31. For example, an estimated speed of the vehicle VE at the target position $P_{ref}$ can be used as a value of the vehicle speed in step S31.

Note that the estimated speed of the vehicle VE at the target position $P_{ref}$ can be calculated in accordance with the following equation (2):

$$V_{pref} = V + dV/dt \times T \qquad (2)$$

Where

1. $V_{pref}$ represents the estimated speed of the vehicle VE at the target position $P_{ref}$ 2. V represents the speed of the vehicle VE at the current position $P_{cur}$ 3. dV/dt represents a current acceleration 4. T represents time required for the vehicle VE to travel from the current position $P_{cur}$ to the target position $P_{ref}$ based on the current acceleration A limited speed at the current position $P_{cur}$, which is defined in the corresponding map data segment, can be used as estimated speed of the vehicle VE at the target position $P_{ref}$.

Third Embodiment

Figure 13:
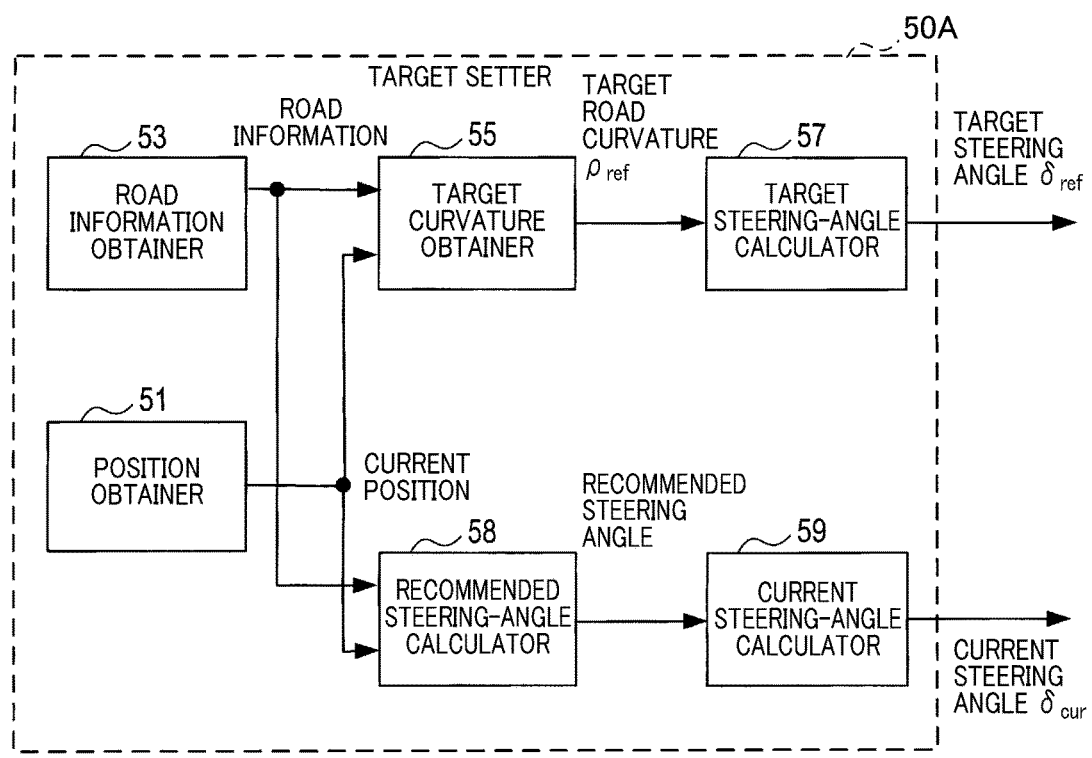
FIG. 13 is a block diagram schematically illustrating an example of the functional structure of a target setter according to the third embodiment of the present disclosure.
Figure 14:
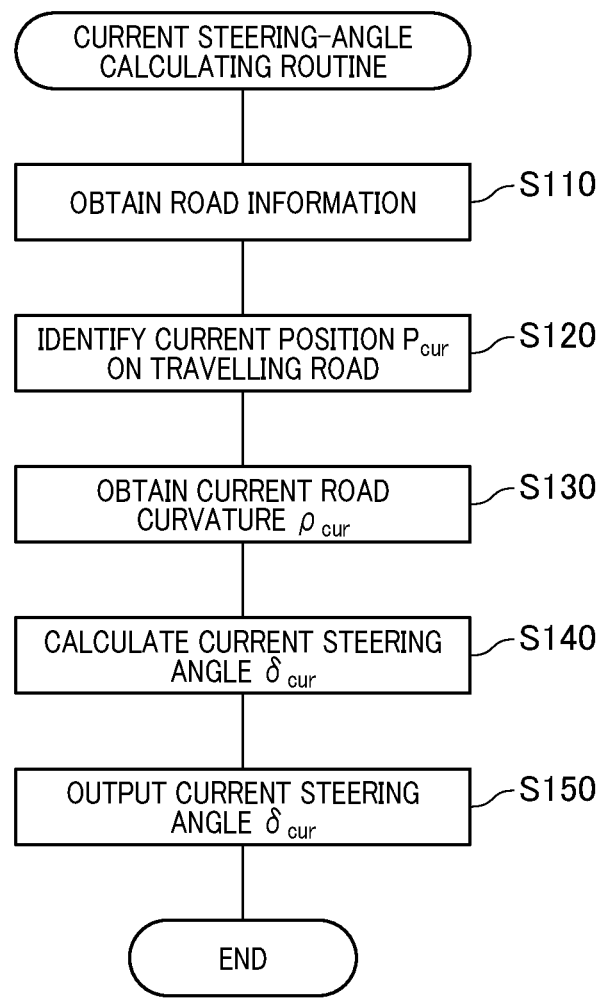
FIG. 14 is a flowchart schematically illustrating a current steering-angle calculating routine executed by the CPU of the controller according to the third embodiment.
Figure 15:
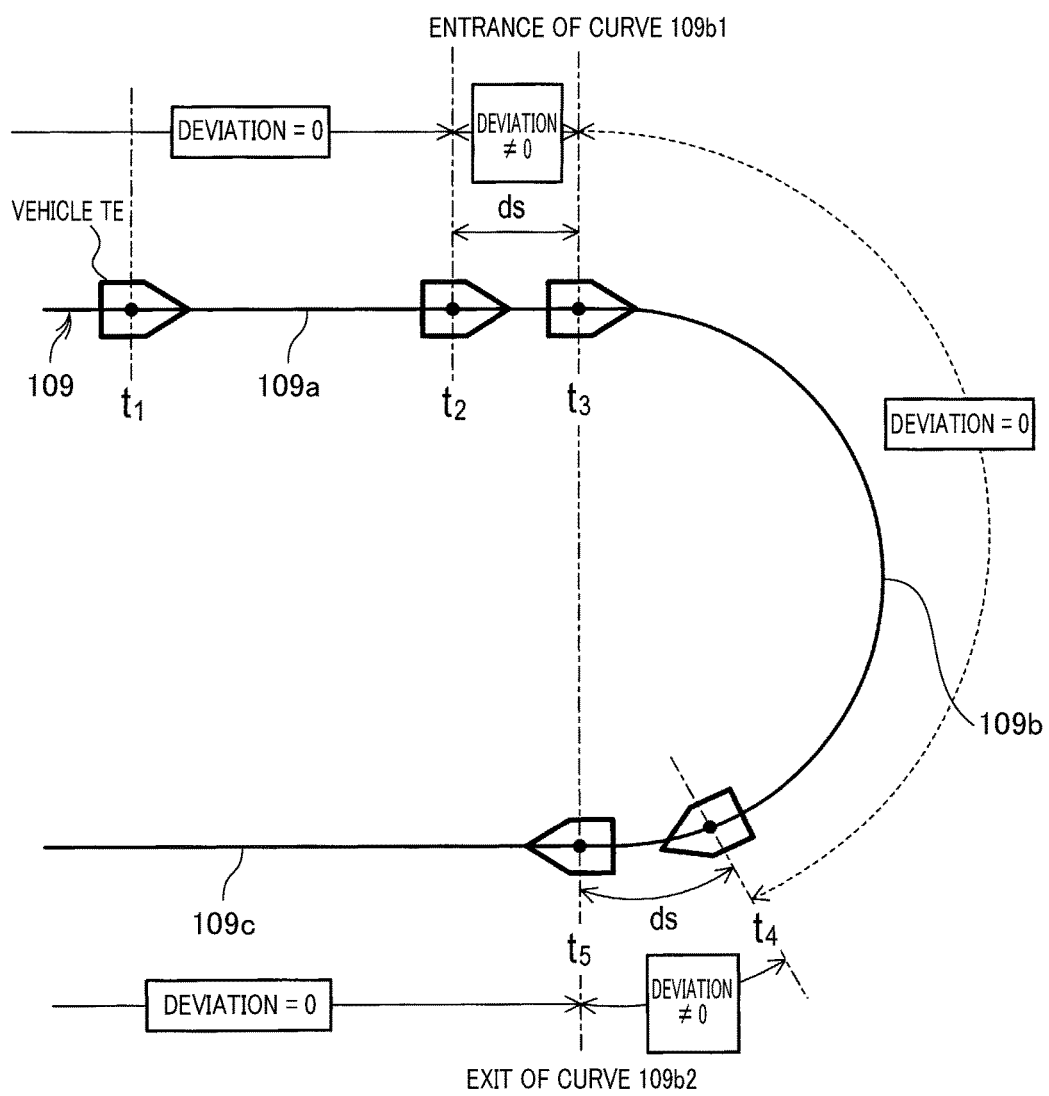
FIG. 15 is a diagram schematically illustrating how the controller according to the third embodiment causes a motor to output corrected torque.

The following describes the third embodiment of the present disclosure with reference to FIGS. 13 to 15. The third embodiment differs from the first embodiment in the following points. So, the following mainly describes the different points, and omits or simplifies descriptions of like parts between the first and third embodiments, to which identical or like reference characters are assigned, thus eliminating redundant description.

The controller 40 according to the first embodiment sets the real steering angle $\delta_{real}$ of the vehicle VE as the current steering angle $\delta_{cur}$ of the vehicle VE.

In contrast, the controller 40 according to the third embodiment is configured to calculate, as the current steering angle $\delta_{cur}$ of the vehicle VE, a recommended steering angle $\delta_{rec}$. The recommended steering angle $\delta_{rec}$ represents a steering angle for causing the vehicle VE to travel along the shape of the travelling road extending in the travelling direction of the vehicle VE. The controller 40 can calculate the recommended steering angle $\delta_{rec}$ based on the curvature of the travelling road at the current position $P_{cur}$ included in the road information 21.

Specifically, referring to FIG. 13, the controller 40 includes a target setter 50A that includes, in addition to the previously described modules 51, 53, 55, 57, and 59, a recommended steering-angle calculator 58. The recommended steering-angle calculator 58 performs a current steering-angle calculating routine for calculating the recommended steering angle $\delta_{rec}$ based on, for example, the curvature of the travelling road at the current position $P_{cur}$ included in the road information 21.

The current steering-angle calculator 59 obtains the recommended steering angle $\delta_{rec}$ calculated by the recommended steering-angle calculator 58 as the current steering angle $\delta_{cur}$, and outputs the recommended steering angle $\delta_{rec}$ to the steering control unit 60.

The following describes the current steering-angle calculating routine carried out by the recommended steering-angle calculator 58, i.e. the CPU 41, with reference to FIG. 14.

When starting the current steering-angle calculating routine, the recommended steering-angle calculator 58 obtains, from the storage device 20, the road information 21 in step S110. Then, the recommended steering-angle calculator 58 identifies the current position $P_{cur}$ of the vehicle VE on the travelling road on a corresponding map segment defined based on the road information 21 in step S120.

Next, the recommended steering-angle calculator 58 obtains, from the road information 21, the curvature of the travelling road at the current position $P_{cur}$ of the vehicle VE as a current road curvature $\rho_{cur}$ in step S130. Then, the recommended steering-angle calculator 58 calculates the recommended steering angle $\delta_{rec}$ in accordance with the following equation (3):

$$\rho_{rec} = \rho_{cur} \times L \times \left\{ 1 - MV^2 \frac{K_f L_f - K_r L_r}{2 L K_f K_r} \right\} \quad (3)$$

Note that the variables included in the equation (3) are respectively identical to the variables included in the equation (1).

Following the operation in step S140, the recommended steering-angle calculator 58 outputs the recommended steering angle $\delta_{rec}$ calculated in step S140 to the steering control unit 60 as the current steering angle $\delta_{cur}$.

Specifically, the controller 40 according to the third embodiment is operative to 1. Calculate the recommended steering angle $\delta_{rec}$ based on the current road curvature $\rho_{cur}$ of the travelling road at the current position $P_{cur}$ of the vehicle VE obtained from the road information 21

2. Set the recommended steering angle $\delta_{rec}$ as the current steering angle $\delta_{cur}$ of the vehicle VE 3. Calculate, based on the target road curvature $\rho_{ref}$ obtained from the road information 21, the target steering angle $\delta_{ref}$ at the target position $P_{ref}$; the target position $\rho_{ref}$ is defined based on the visible distance $d_s$ of the driver of the vehicle VE 4. Cause the motor 6 to generate and output corrected torque to reduce the deviation between the current steering angle $\delta_{cur}$ and the target steering angle $\delta_{ref}$ This configuration enables the corrected torque to match the current steering angle $\delta_{cur}$ obtained based on the road information 21 with the target steering angle $\delta_{ref}$ based on the road information 21. This results in the corrected torque depending on change in the shape of the travelling road. Change in the shape of the travelling road represents that the curvature of the travelling road changes at the entrance of a curve and at the exit of the curve.

The following describes how the controller 40 according to the third embodiment causes the motor 6 to output the corrected torque with reference to FIG. 15.

FIG. 15 schematically illustrates that a road 109, on which the vehicle VE is travelling, continuously includes a first straight segment 109a, a curve 109b, and a second straight segment 109c. The curvature of the curve 109b from its entrance 109b1 to its exit 109b2 is set to be constant.

While the vehicle VE is travelling on the first straight segment 109a for a period from time t1 to time t2, the deviation of the current steering angle $\delta_{cur}$ obtained based on the road information 21 from the target steering angle $\delta_{ref}$ is zero. Specifically, the tracking command value TC output from the second command calculator 62 is zero, so that no corrected torque based on the tracking command value TC is transferred from the motor 6 to the steering shaft assembly 5 via the gear mechanism 7. Note that the time t2 represents time at which the vehicle VE has reached a point on the travelling road 109 positioned the visible distance $d_s$ before the entrance 109b1 of the curve 109b.

While the vehicle VE is travelling from the point at the time t2 to the entrance 109b1 of the curve 109b at time t3, the deviation of the current steering angle $\delta_{cur}$ obtained based on the road information 21 from the target steering angle $\delta_{ref}$ is generated. This causes the second command calculator 62 to generate, based on the deviation, the tracking command value TC to cause the vehicle VE to travel along the curve 109b, so that corrected torque based on the tracking command value TC is transferred from the motor 6 to the steering shaft assembly 5 via the gear mechanism 7.

While the vehicle VE is travelling on the curve 109b from the entrance 109b1 at the time t3 to time t4, the deviation of the current steering angle $\delta_{cur}$ obtained based on the road information 21 from the target steering angle $\delta_{ref}$ is zero. Specifically, the tracking command value TC output from the second command calculator 62 is zero, so that no corrected torque based on the tracking command value TC is transferred from the motor 6 to the steering shaft assembly 5 via the gear mechanism 7. Note that the time t4 represents time at which the vehicle VE has reached a point on the travelling road 109 positioned the visible distance $d_s$ before the exit 109b2 of the curve 109b.

While the vehicle VE is travelling from the point at the time t4 to the exit 109b2 of the curve 109b at time t5, the deviation of the current steering angle $\delta_{cur}$ obtained based on the road information 21 from the target steering angle $\delta_{ref}$ is generated. This causes the second command calculator 62 to generate, based on the deviation, the tracking command value TC to travel the vehicle VE along the curve 109b, so that corrected torque based on the tracking command value TC is transferred from the motor 6 to the steering shaft assembly 5 via the gear mechanism 7.

After the time t5 at which the vehicle VE has reached the exit of the curve 109b, the deviation of the current steering angle $\delta_{cur}$ obtained based on the road information 21 from the target steering angle $\delta_{ref}$ is zero. Specifically, the tracking command value TC output from the second command calculator 62 is zero, so that no corrected torque based on the tracking command value TC is transferred from the motor 6 to the steering shaft assembly 5 via the gear mechanism 7.

As described above, the controller 40 according to the third embodiment is configured to cause the motor 6 to output the corrected torque to the steering shaft assembly 5 via the gear mechanism 7 when the vehicle VE is travelling at a predetermined distance, such as the visual distance $d_s$, before the entrance or exit of a curve. This configuration enables the corrected torque to be output to the steering shaft assembly 5 via the gear mechanism 7 each time the vehicle VE reaches a point of the travelling road at which the shape, i.e. curvature, is changed. For example, this configuration enables the corrected torque to be output to the steering shaft assembly 5 via the gear mechanism 7 each time the vehicle VE reaches a point of the travelling road at which the shape of the travelling road is changed from a curve to a straight line or from a straight line to a curve.

As described above, the controller 40 according to the third embodiment is configured to 1. Extract, from the road information 21, the curvature of the travelling road at the current position $P_{cur}$ of the vehicle VE 2. Calculate the recommended steering angle $\delta_{rec}$ based on, for example, the curvature of the travelling road at the current position $P_{cur}$ included in the road information 21

3. Obtain the recommended steering angle $\delta_{rec}$ calculated by the recommended steering-angle calculator 58 as the current steering angle $\delta_{cur}$ This configuration of the controller 40 according to the third embodiment achieves the following advantageous effect in addition to the advantageous effects achieved by the controller 40 according to the first embodiment.

Specifically, this configuration of the controller 40 according to the third embodiment enables the driver of the vehicle VE to recognize change in shape of the travelling road based on change of the corrected torque. This therefore makes it possible to guide the driver to cruise the vehicle VE along the changed shape, i.e. the curvature of the travelling road.

This configuration of the controller 40 according to the third embodiment also results in a lower frequency of correcting the driver's steering angle of the steering wheel 2 as compared with the configuration of the first embodiment, which sets the real steering angle $\delta_{real}$ of the vehicle VE as the current steering angle $\delta_{cur}$ of the vehicle VE. This is because this configuration of the controller 40 according to the third embodiment prevents correction of the driver's steering angle when the driver of the vehicle VE operates the steering wheel 2 by predetermined minute angles while the vehicle VE is travelling on a straight road for avoiding a collision to obstacles. Similarly, this configuration prevents correction of the driver's steering angle when the driver of the vehicle VE drives the vehicle VE to travel on a predetermined route using the real steering angle $\delta_{real}$ being set to the target steering angle $\delta_{ref}$.

This configuration therefore reduces unnecessary assisting of the driver's steering operation of the steering wheel 2.

Fourth Embodiment

Figure 16:
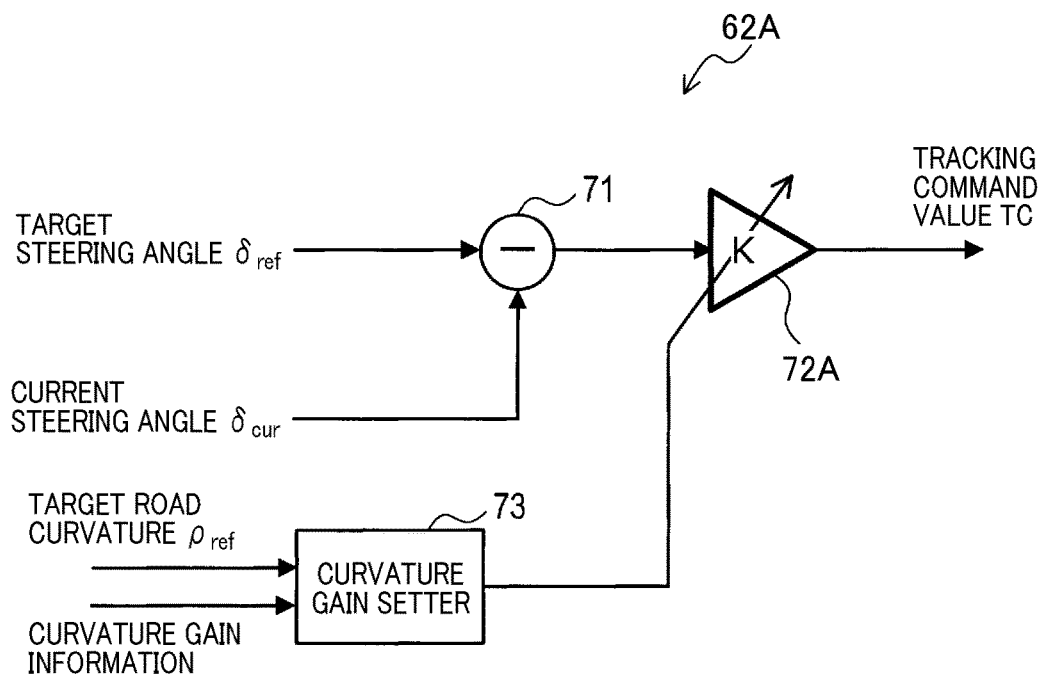
FIG. 16 is a circuit diagram schematically illustrating an example of the functional structure of a second command calculator according to the fourth embodiment of the present disclosure.
Figure 17:
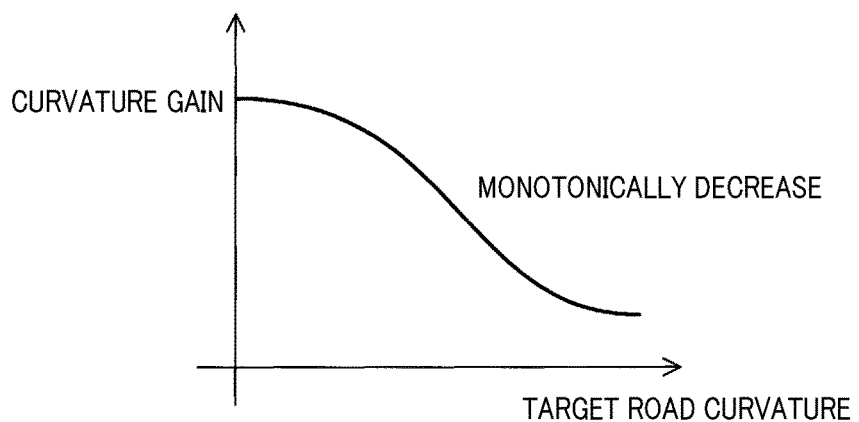
FIG. 17 is a graph schematically illustrating curvature gain information according to the fourth embodiment.

The following describes the fourth embodiment of the present disclosure with reference to FIGS. 16 and 17. The fourth embodiment differs from the first embodiment in the following points. So, the following mainly describes the different points, and omits or simplifies descriptions of like parts between the first and fourth embodiments, to which identical or like reference characters are assigned, thus eliminating redundant description.

Specifically, referring to FIG. 16, the steering control unit 60 of the controller 40 includes a second command calculator 62A that includes the deviation calculator 71 set forth above, a determiner 72A, and a curvature gain setter 73.

The curvature gain setter 73 is configured to set a curvature gain based on the target road curvature $\rho_{ref}$ and curvature gain information I7 stored in the memory device 42. Note that the curvature gain represents a gain as a function of the target road curvature $\rho_{ref}$.

For example, the curvature gain information I7 represents the relationship between the curvature gain and the target road curvature $\rho_{ref}$. For example, the curvature gain information I7 shows change of the curvature gain as a function of the target road curvature $\rho_{ref}$. The curvature gain information I7, which has been determined by experiment, can be configured such that the curvature gain monotonically decreases with an increase of the target road curvature $\rho_{ref}$ in order to obtain comfortable handling characteristics for the driver (see FIG. 17).

The curvature gain setter 73 sets, based on the curvature gain information I7, a value of the curvature gain. For example, the curvature gain setter 73 extracts, from the curvature gain information I7, a value of the curvature gain corresponding to a value of the target road curvature $\beta_{ref}$. Then, the curvature gain setter 73 outputs the curvature gain to the determiner 72A.

The determiner 72A receives the curvature gain, and reads the tracking gain stored in the memory device 42. Then, the determiner 72A multiplies the tracking gain read from the memory device 42 by the curvature gain, thus calculating an updated tracking gain. Thereafter, the determiner 72A multiplies the deviation ($\delta_{ref}$-$\delta_{cur}$) by the updated tracking gain, thus determining the tracking command value TC. Then, the determiner 72A outputs the tracking command value TC to the adder 64.

That is, let us consider a case where the vehicle VE is about to travel the travelling road having a greater curvature, i.e. the travelling road having a sudden curve with a smaller radius of curvature.

In this case, the inventors of the above-identified application have determined by experiment that drivers tend to have a hand feeling that the steering wheel 2 has been excessively turned due to the tracking command value TC being too large.

In contrast, let us consider a case where the vehicle VE is about to travel a travelling road having a smaller curvature, i.e. the travelling road having a larger radius of curvature.

In this case, the inventors of the above-identified application have determined by experiment that drivers tend to have a hand feeling that the steering wheel 2 has not been turned sufficiently due to the tracking command value TC being too small.

In view of these driver's tendencies, the second command calculator 62A according to the fourth embodiment specially includes the curvature gain setter 73 that sets the curvature gain such that the curvature gain monotonically decreases with an increase of the target road curvature $\rho_{ref}$.

That is, the curvature gain setter 73 extracts, from the curvature gain information I7, a value of the curvature gain corresponding to a value of the target road curvature $\rho_{ref}$. Then, the curvature gain setter 73 outputs the curvature gain to the determiner 72A.

The determiner 72A receives the curvature gain, and reads the tracking gain stored in the memory device 42. Then, the determiner 72A multiplies the tracking gain read from the memory device 42 by the curvature gain, thus calculating an updated tracking gain. Thereafter, the determiner 72A multiplies the deviation ($\delta_{ref}$-$\delta_{cur}$) by the updated tracking gain, thus determining the tracking command value TC. Then, the determiner 72 outputs the tracking command value TC to the adder 64.

This configuration of the controller 40 according to the fourth embodiment therefore achieves the following advantageous effect in addition to the advantageous effects achieved by the controller 40 according to the first embodiment.

Specifically, the configuration of the controller 40 according to the fourth embodiment enables the driver of the vehicle VE to have better hand feeling while the driver drives the vehicle VE to travel along the shape of the travelling road.

Fifth Embodiment

Figure 18:
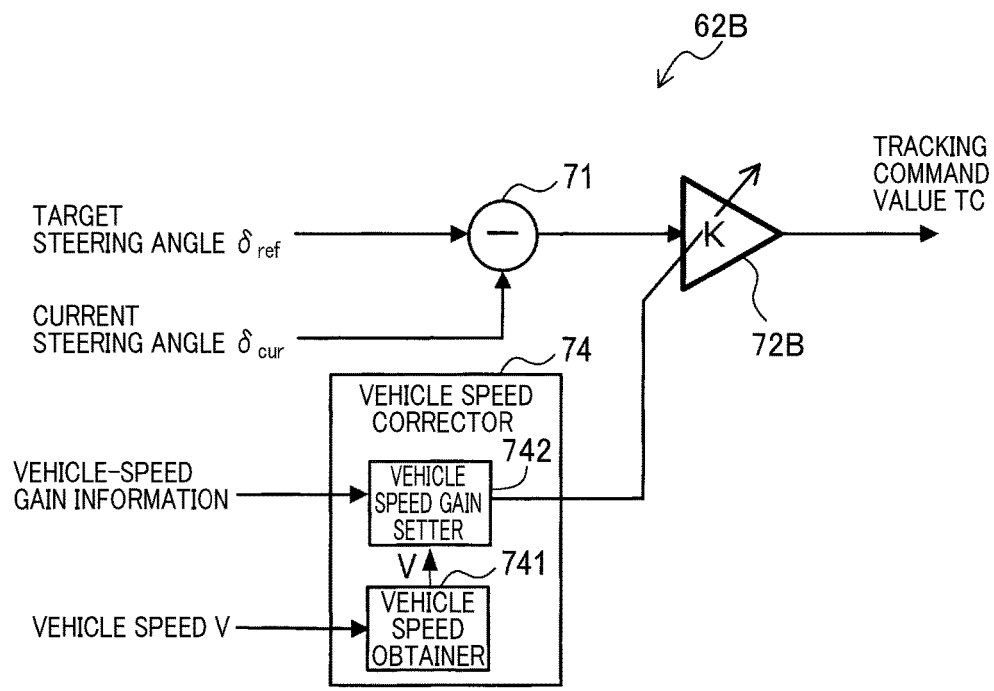
FIG. 18 is a circuit diagram schematically illustrating an example of the functional structure of a second command calculator according to the fifth embodiment of the present disclosure.
Figure 19:
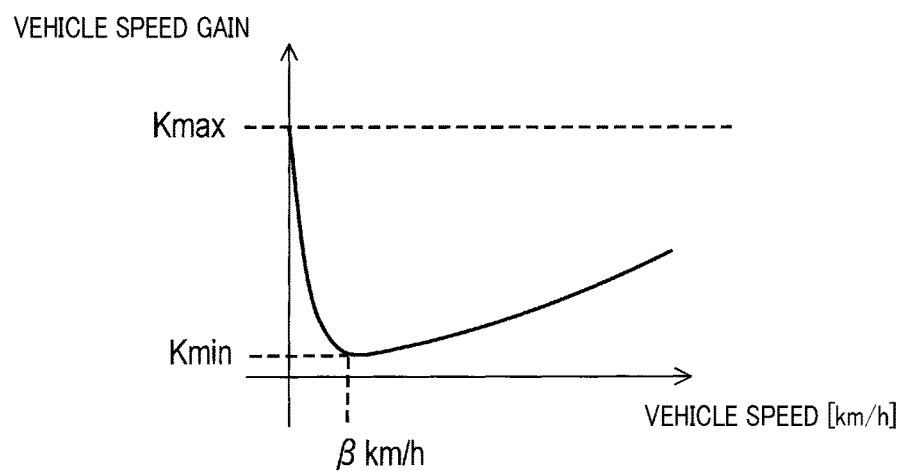
FIG. 19 is a graph schematically illustrating vehicle-speed gain information according to the fifth embodiment.
Figure 20:
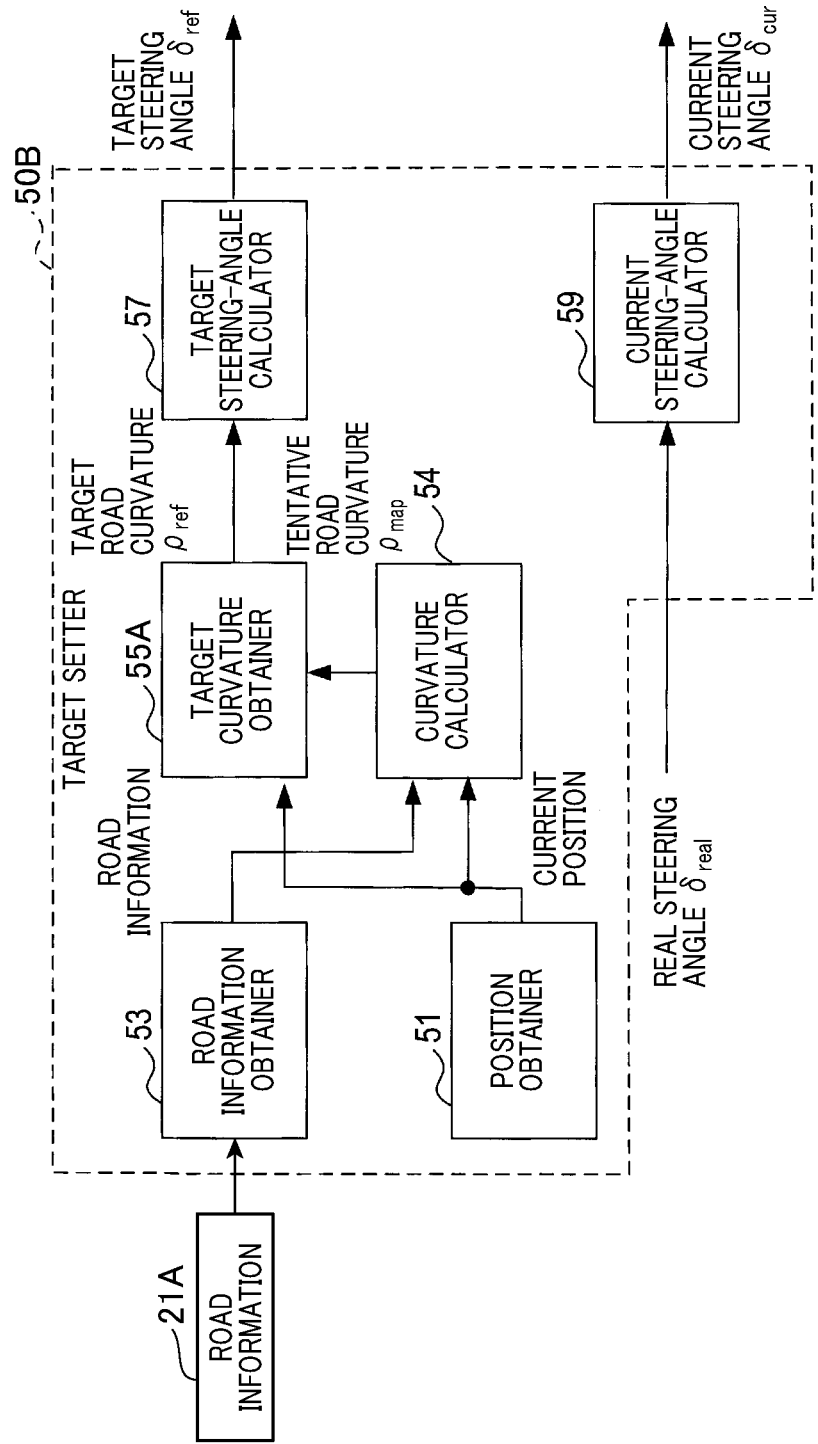
FIG. 20 is a block diagram schematically illustrating an example of the functional structure of a target setter according to the sixth embodiment of the present disclosure.

The following describes the fifth embodiment of the present disclosure with reference to FIGS. 18 and 19. The fifth embodiment differs from the first embodiment in the following points. So, the following mainly describes the different points, and omits or simplifies descriptions of like parts between the first and fifth embodiments, to which identical or like reference characters are assigned, thus eliminating redundant description.

Specifically, referring to FIG. 18, the steering control unit 60 of the controller 40 includes a second command calculator 62B that includes the deviation calculator 71 set forth above, a determiner 72B, and a vehicle speed corrector 74. The vehicle speed corrector 74 includes a vehicle speed obtainer 741 and a vehicle speed gain setter 742.

The vehicle speed obtainer 741 obtains the vehicle speed V from the vehicle speed sensor 31, and outputs the vehicle speed V to the vehicle speed gain setter 742. The vehicle speed gain setter 742 receives the vehicle speed V output from the vehicle speed obtainer 741, and reads vehicle-speed gain information I8 stored in the memory device 42. Then, the vehicle speed gain setter 742 sets a vehicle-speed gain based on the vehicle speed V and the vehicle-speed gain information I8. Note that the vehicle-speed gain represents a gain as a function of the vehicle speed V.

For example, the vehicle-speed gain information I8 represents the relationship between the vehicle-speed gain and the vehicle speed V. For example, the vehicle-speed gain information I8 shows change of the vehicle-speed gain as a function of the vehicle speed V, which is expressed in kilometers per hour (km/h). The vehicle-speed gain information I8, which has been determined by experiment, can be configured such that 1. The vehicle-speed gain rapidly decreases from its maximum value Kmax to its minimum value Kmin as the vehicle speed V increases from zero to boundary speed β

2. The vehicle-speed gain monotonically increases with an increase of the vehicle speed V from the boundary speed β (see FIG. 19).

The vehicle-speed gain setter 742 sets, based on the vehicle-speed gain information I8, a value of the vehicle-speed gain. For example, the vehicle-speed gain setter 742 extracts, from the vehicle-speed gain information I8, a value of the vehicle-speed gain corresponding to a value of the vehicle speed V. Then, the vehicle-speed gain setter 742 outputs the vehicle-speed gain to the determiner 72B.

The determiner 72B receives the vehicle-speed gain, and reads the tracking gain stored in the memory device 42. Then, the determiner 72B multiplies the tracking gain read from the memory device 42 by the vehicle-sped gain, thus calculating an updated tracking gain. Thereafter, the determiner 72B multiplies the deviation ($\delta_{ref}$-$\delta_{cur}$) by the updated tracking gain, thus determining the tracking command value TC. Then, the determiner 72B outputs the tracking command value TC to the adder 64.

The inventors of the above-identified application have determined by experiment that drivers tend to have a hand feeling to turn the steering wheel 2 hard as the vehicle speed V increases due to, for example, self-aligning torque.

In view of this driver's tendency, the second command calculator 62B according to the fifth embodiment specially includes the vehicle-speed gain setter 742 that sets the vehicle-speed gain such that 1. The vehicle-speed gain rapidly decreases from its maximum value Kmax to its minimum value Kmin as the vehicle speed V increases from zero to the boundary speed β

2. The vehicle-speed gain monotonically increases with an increase of the vehicle speed V from the boundary speed β (see FIG. 19).

This enables the driver's turning effort of the steering wheel 2 to be properly assisted as the vehicle speed V increases from the boundary speed β.

The vehicle-speed gain information I8 can be configured such that the vehicle-speed gain monotonically increases with an increase of the vehicle speed V from zero. The vehicle-speed gain information I8 can be configured such that the vehicle-speed gain monotonically increases without exceeding the maximum vehicle-speed gain Kmax with an increase of the vehicle speed V from the boundary speed β.

Note that the boundary speed β represents a value of the vehicle speed V from which the vehicle VE starts to move on the travelling road in accordance with a predetermined dynamic friction coefficient of the travelling road.

That is, the controller 40 according to the fifth embodiment is configured to determine the tracking command value TC multiplied by the vehicle-speed gain; the vehicle-speed gain increases with an increase of the vehicle speed VE from zero or the boundary speed R.

This configuration of the controller 40 according to the fifth embodiment achieves the following advantageous effect in addition to the advantageous effects achieved by the controller 40 according to the first embodiment.

Specifically, the configuration of the controller 40 according to the fifth embodiment enables the driver of the vehicle VE to have better hand feeling while the vehicle speed V increases from, for example, zero or the boundary speed.

Sixth Embodiment

The following describes the sixth embodiment of the present disclosure with reference to FIGS. 20 to 23. The sixth embodiment differs from the first embodiment in the following points. So, the following mainly describes the different points, and omits or simplifies descriptions of like parts between the first and sixth embodiments, to which identical or like reference characters are assigned, thus eliminating redundant description.

The road information 21 according to the first embodiment includes the curvature at any position on each of roads in the areas in which the vehicle VE can travel. The target curvature obtainer 55 obtains, based on the road information 21, the target road curvature $\rho_{ref}$ at the target position $\rho_{ref}$ of the travelling road.

In contrast, road information 21A according to the sixth embodiment does not include the curvature at any position on each of roads in the areas in which the vehicle VE can travel. In addition, referring to FIG. 20, the controller 40 includes a target setter 50B that includes, in addition to the previously described modules 51, 53, 57, and 59, a curvature calculator 54 and a target curvature obtainer 55A.

Specifically, the road information 21A includes, for example, the coordinates, i.e. the latitude and longitude, of each of interpolation points; the interpolation points are previously determined on each road on which the vehicle VE can travel. The road information 21A also includes connection information indicative of connection relationships among the interpolation points. In particular, the connection information represents that each interpolation point is connected to which of the other interpolation points.

The curvature calculator 54 performs, based on the road information 21A, a curvature calculating routine for calculating the curvature $\rho_{map}$ at a predetermined point of a tentative travelling road.

At that time, the target curvature obtainer 55A determines a curvature $\rho_{map}$ at the predetermined point of the tentative travelling road as the target road curvature $\rho_{ref}$ at the target position $P_{ref}$ of the travelling road, thus obtaining the target road curvature $\rho_{ref}$.

That is, the target curvature obtainer 55A performs a target curvature calculating routine described later to obtain the target road curvature $\rho_{rer}$. Then, the target curvature obtainer 55A outputs the target road curvature $\rho_{rer}$ to the target steering-angle calculator 57.

Figure 21:
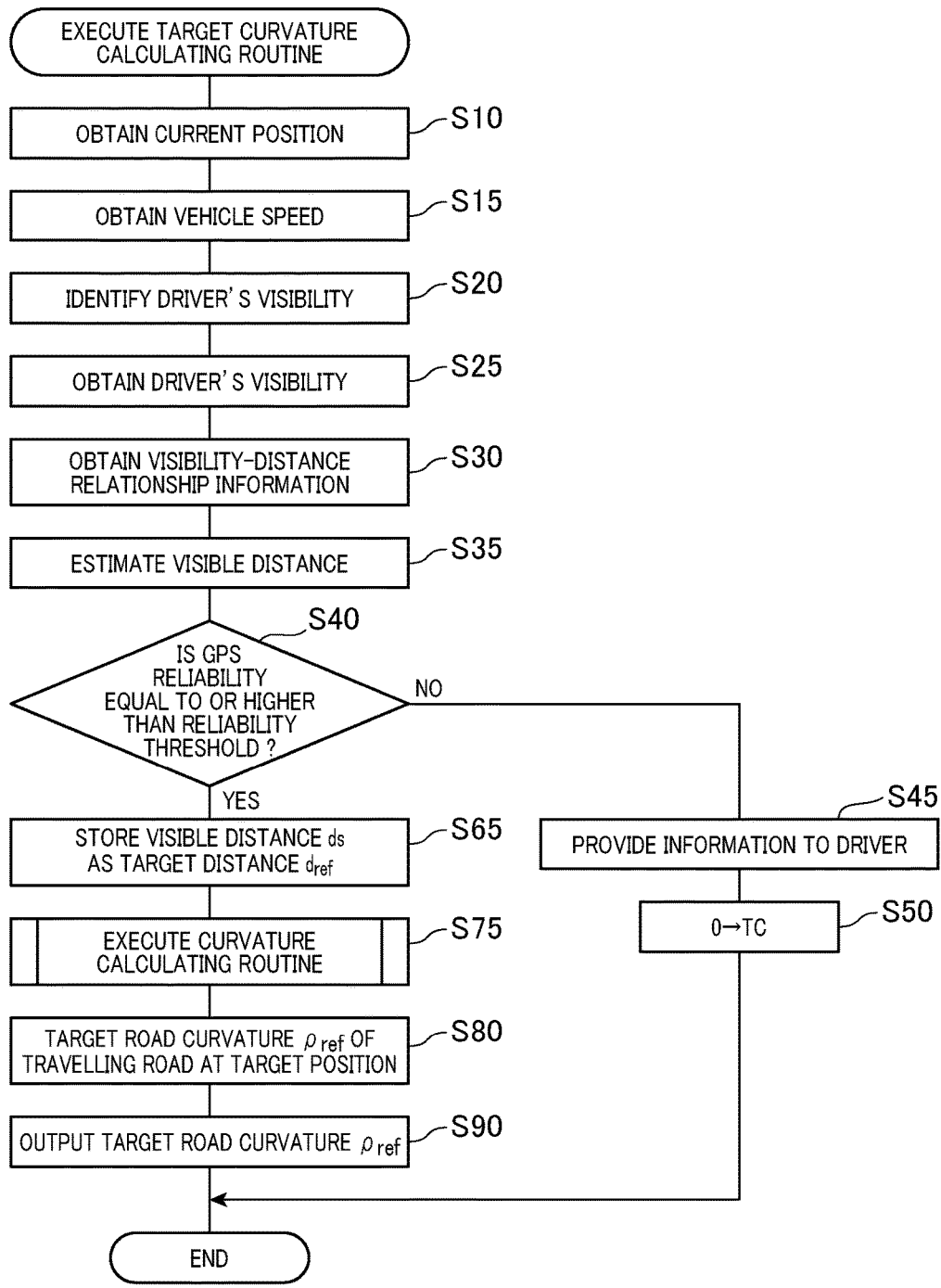
FIG. 21 is a flowchart schematically illustrating a target curvature calculating routine executed by the CPU of the controller according to the sixth embodiment.

Next, the following describes the target curvature calculating routine carried out by the target curvature obtainer 55A, i.e. the CPU 41, with reference to FIG. 21. As compared with the target curvature calculating routine illustrated in FIG. 6, the operations in steps S55 to S60 and S70 have been eliminated from the target curvature calculating routine illustrated in FIG. 21, and a new operation in step S75 has been added to the target curvature calculating routine illustrated in FIG. 21.

Following the operation in step S65, the target curvature obtainer 55A instructs the curvature calculator 54 to perform the curvature calculating routine in step S75.

Figure 22:
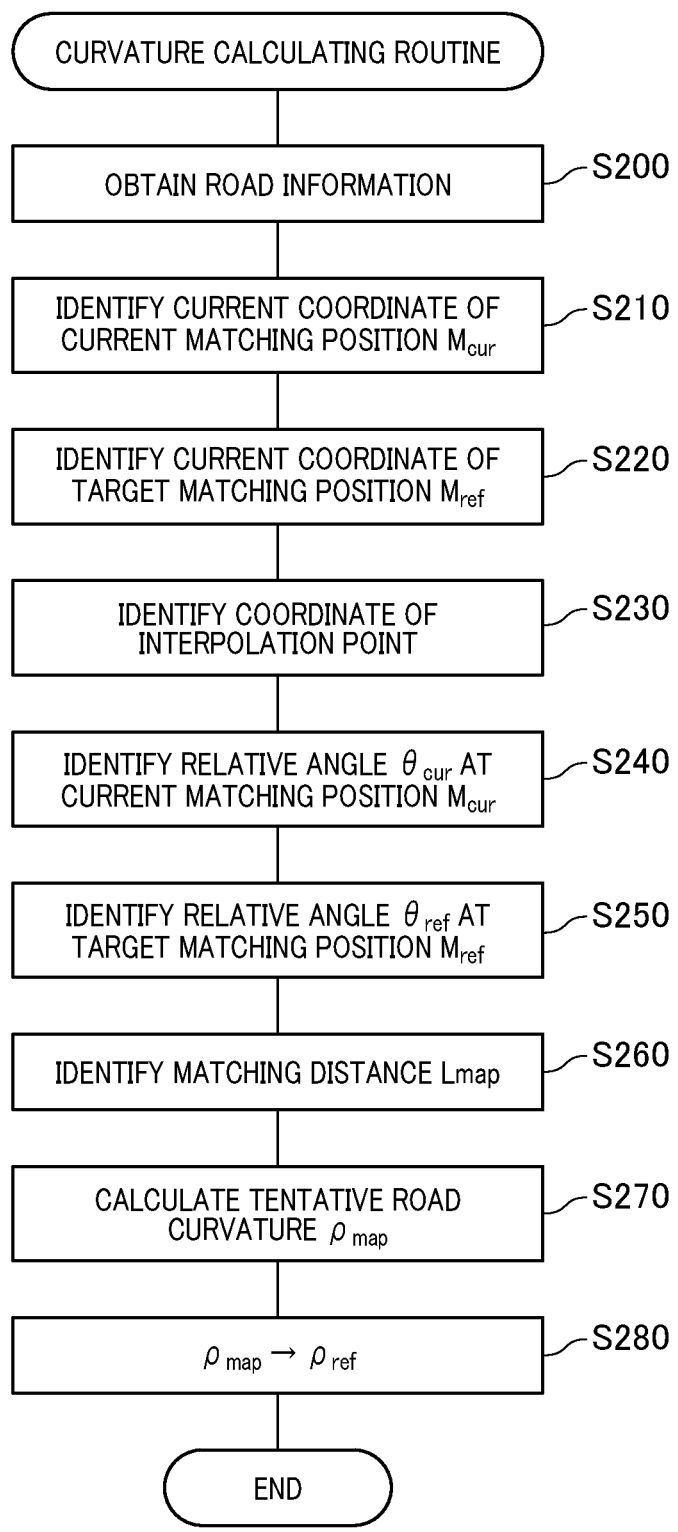
FIG. 22 is a flowchart schematically illustrating a curvature calculating routine in step S75 of FIG. 21
Figure 23:
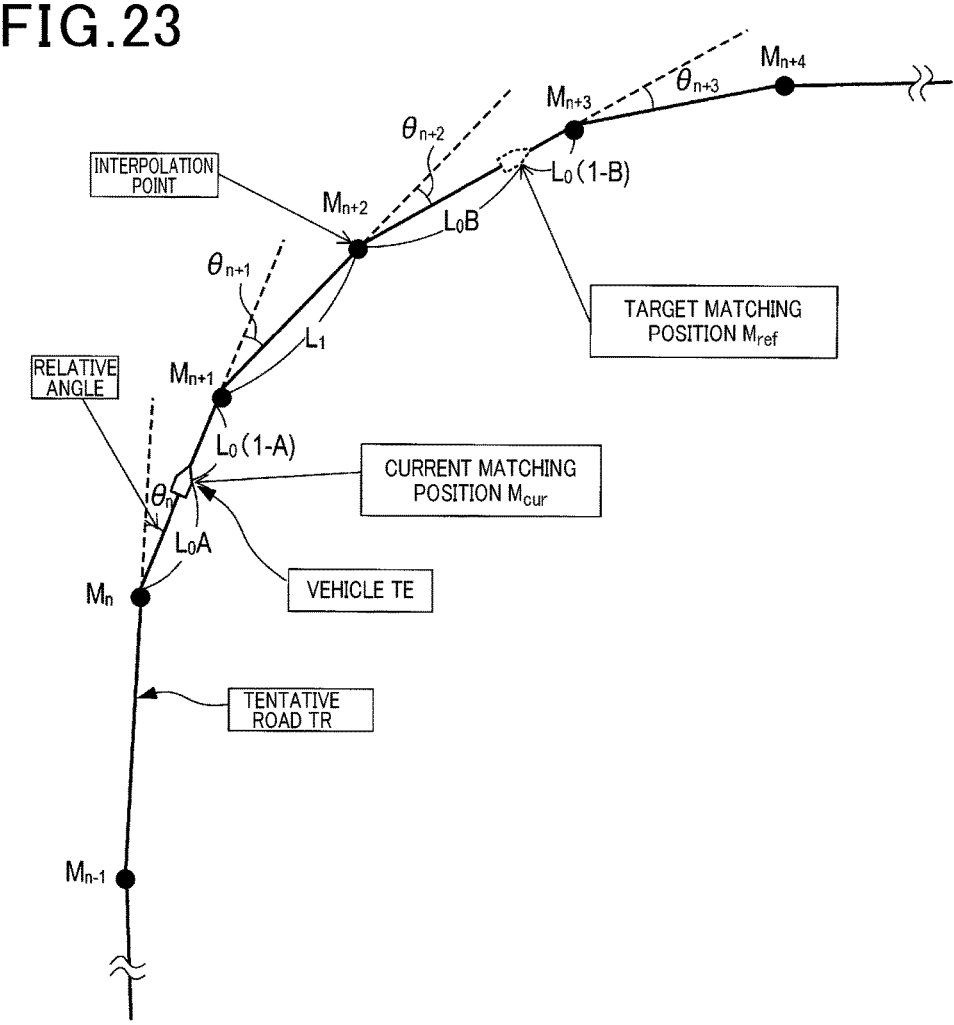
FIG. 23 is a diagram schematically illustrating how the controller calculates the target curvature according to the sixth embodiment.

When instructed by the target curvature obtainer 55A, the curvature calculator 54 performs the curvature calculating routine Specifically, referring to FIG. 22, the curvature calculator 54 obtains, from the storage device 20, the road information 21 in step S200. As described above, the road information 21A includes the coordinates of each of interpolation points; the interpolation points are previously determined on each road on which the vehicle VE can travel. The road information 21A also includes the connection information indicative of the connection relationships among the interpolation points. The interpolation points on a road represent respective positions on the road; the positions are arranged on the road at regular intervals. The connection information specifically represents that each of the interpolation points is connected to any one of the other interpolation points on a corresponding road. For example, FIG. 23 illustrates interpolation points $M_{n-1}, M_n, M_{n+1}, M_{n+2}, M_{n+3}, M_{n+4}, \ldots$ The interpolation points $M_{n-1}, M_n, M_{n+1}, M_{n+2}, M_{n+3}, M_{n+4}, \ldots$ are connected to each other based on the connection information, so that the shape of a tentative road, i.e. a candidate road, TR on which the vehicle VE is located is obtained.

Following the operation in step S200, the curvature calculator 54 matches the current position $P_{cur}$ of the vehicle VE with the tentative road TR, thus identifying the coordinates of a current matching position $M_{cur}$ of the vehicle VE on the tentative road TR in step S210. For example, the curvature calculator 54 correlates the current position $P_{cur}$ of the vehicle VE with the tentative road TR, thus identifying the coordinates of the current matching position $M_{cur}$ of the vehicle VE on the tentative road TR using one of known identifying method, such as a map matching method.

Next, in step S220, the curvature calculator 54 matches the target position $P_{ref}$ of the vehicle VE with the tentative road TR in the same approach as the operation in step S210, thus identifying the coordinates of a target matching position $M_{cur}$ of the vehicle VE on the tentative road TR.

Following the operation in step S220, the curvature calculator 54 identifies the coordinates of at least one interpolation point located between the current matching position $M_{cur}$ and the target matching position $M_{ref}$ as the coordinates of at least one intermediate interpolation point in step S230. For example, in the example illustrated in FIG. 23, the curvature calculator 54 detects the intermediation point $M_{n+1}$ and the intermediation point $M_{n+2}$ as first and second intermediate intermediation points $M_{n+1}$ and $M_{n+2}$, thus identifying the coordinates of each of the first and second intermediate intermediation points $M_{n+1}$ and $M_{n+2}$.

Following the operation in step S230, the curvature calculator 54 calculates a tentative road curvature $\rho_{map}$ at the target matching position $M_{ref}$ of the tentative road TR in accordance with the coordinates of the current matching position $M_{cur}$, the coordinates of the target matching position $M_{ref}$, and the coordinates of the at least one intermediate interpolation point in steps S240 to S280.

Specifically, in step S240, the curvature calculator 54 calculates a relative angle $\theta_{cur}$ at the current matching position $M_{cur}$.

The following describes what the relative angle $\theta_{cur}$ means. For example, as illustrated in FIG. 23, the relative angle $\theta_n$ at the interpolation point $M_n$ is defined as an angle between 1. A rear straight line passing through the interpolation point $M_n$ and the interpolation point $M_{n-}$, which is located one point behind the interpolation point $M_n$ 2. A front straight line passing through the interpolation point $M_n$ and the interpolation point $M_{n+1}$, which is located one point ahead the interpolation point $M_n$ The "ahead" direction corresponds to the travelling direction of the vehicle VE, and the "behind" direction is the direction opposite to the "ahead" direction.

The curvature calculator 54 calculates the rear straight line and the front straight line in accordance with the coordinates of the interpolation point $M_n$, the coordinates of the interpolation point $M_{n-1}$, referred to as a rear interpolation point $M_{n-1}$, and the coordinates of the interpolation point $M_{n+1}$, referred to as a front interpolation point $M_{n+1}$.

That is, the relative angle $\theta_n$ at the interpolation point $M_n$ can be calculated based on the coordinates of the interpolation point $M_n$, the coordinates of the rear interpolation point $M_{n-1}$, and the coordinates of the front interpolation point $M_{n+1}$.

The curvature calculator 54 can calculate the relative angle at any interpolation point in accordance with the road information 21, because the road information 21 includes the coordinates at any interpolation point.

For example, as illustrated in FIG. 23 it is assumed that the current matching position $M_{cur}$ is located between the interpolation point $M_n$ and the front interpolation point $M_{n+1}$. In this assumption, the curvature calculator 54 calculates a relative angle $\theta_{pt}$ at any position Pt between the interpolation point $M_n$ and the front interpolation point $M_{n+1}$ in accordance with the following equation (4):

$$\theta_{pt} = (1-A)\theta_n + A\theta_{n+1} \qquad (4)$$

Where $\theta_n$ represents the relative angle at the interpolation point $M_n$, and $\theta_{n+1}$ represents the relative angle at the front interpolation point $M_{n+1}$. Reference character A in the equation (4) represents the ratio of a target distance to an interpolation distance; the target distance represents a distance from the interpolation point $M_n$ to the position Pt, and the interpolation distance represents a distance from the interpolation point $M_n$ to the front interpolation point $M_{n+1}$. The ratio A, which will be referred to as a distance ratio, can be expressed as a numerical value within the range from 0 inclusive to 1 exclusive. That is, the distance ratio A can be calculated based on the coordinates of the interpolation point $M_n$, the coordinates of the position Pt, and the coordinates of the front interpolation point $M_{n+1}$.

If a world coordinate system having an x axis as a predetermined horizontal axis, a y axis as a predetermined longitudinal axis, and a z axis as a predetermined vertical axis is used for expressing each interpolation point as (x, y, z), the distance ratio A can be calculated based on any one of the x coordinate and y coordinate of each of the interpolation point $M_n$, the position Pt, and the front interpolation point $M_{n+1}$.

That is, the curvature calculator 54 calculates the relative angle $\theta_{cur}$ at the current matching position $M_{cur}$ located between the interpolation point $M_n$ and the front interpolation point $M_{n+1}$ in accordance with the following equation (5):

$$\theta_{cur} = (1-A)\theta_n + A\theta_{n+1} \qquad (5)$$

Where A represents the ratio of the target distance to the interpolation distance; the target distance represents the distance from the interpolation point $M_n$ to the current matching position $M_{cur}$, and the interpolation distance represents the distance from the interpolation point $M_n$ to the front interpolation point $M_{n+1}$.

Following the operation in step S200, the curvature calculator 54 calculates a relative angle $\theta_{ref}$ at the target matching position $M_{ref}$ in step S250.

For example, as illustrated in FIG. 23 it is assumed that the target matching position $M_{ref}$ is located between the interpolation point $M_{n+2}$ and the interpolation point $M_{n+3}$. In this assumption, the curvature calculator 54 calculates a relative angle $\theta_{ref}$ at the target matching position $M_{ref}$ in accordance with the following equation (6):

$$\theta_{ref} = (1-B)\theta_{n+2} + B\theta_{n+3} \qquad (6)$$

Where $\theta_{n+2}$ represents the relative angle at the interpolation point $M_{n+2}$, and $\theta_{n+3}$ represents the relative angle at the interpolation point $M_{n+3}$. Reference character B in the equation (6) represents the ratio of the target distance to the interpolation distance; the target distance represents the distance from the interpolation point $M_{n+2}$ to the target matching position $M_{ref}$, and the interpolation distance represents the distance from the interpolation point $M_{n+2}$ to the front interpolation point $M_{n+3}$.

Following the operation in step S250, the curvature calculator 54 identifies a matching distance $L_{map}$; the matching distance $L_{map}$ represents a distance between the current matching position $M_{cur}$ and the target matching position $M_{ref}$ on the tentative road TR in step S260. In the example illustrated in FIG. 23, the curvature calculator 54 calculates the matching distance $L_{map}$ in accordance with the following equation (7):

$$L_{map} = L_n(1-A) + L_{n+1} + L_{n+2}B \qquad (7)$$

Where $L_n$ represents a distance from the interpolation point $M_n$ and the interpolation point $M_{n+1}$, $L_{n+1}$ represents a distance from the interpolation point $M_{n+1}$ and the interpolation point $M_{n+2}$, and $L_{n+2}$ represents a distance from the interpolation point $M_{n+2}$ and the interpolation point $M_{n+3}$.

Next, the curvature calculator 54 calculates the curvature at the target matching position $M_{ref}$ on the tentative road TR as the tentative road curvature $\rho_{map}$ in step S270.

Note that, assuming that the tentative road TR including a start position Ps and an end position Pe is defined, the curvature $\rho_e$ at the end position Pe on the tentative road TR can be calculated in accordance with the following equation (8):

$$\rho_e = \frac{(\theta_e - \theta_s)}{L_{se}} \qquad (8)$$

Where $L_{se}$ represents the distance from the start position Ps to the end position Pe on the tentative road TR.

That is, dividing the subtraction of the relative angle $\theta_s$ at the start position Ps from the relative angle $\theta_e$ at the end position Pe by the distance $L_{se}$ from the start position Ps to the end position Pe on the tentative road TR enables the curvature $\rho_e$ at the end position Pe on the tentative road TR to be calculated.

That is, in the equation (8), the relative angle $\theta_s$ at the start position Ps is replaced with the relative angle $\theta_{cur}$ at the current matching position $M_{cur}$. In the equation (8), the relative angle $\theta_e$ at the end position Pe is replaced with the relative angle $\theta_{ref}$ at the target matching position $M_{ref}$. In the equation (8), the distance $L_{se}$ from the start position Ps to the end position Pe on the tentative road TR is replaced with the distance $L_{map}$ from the current matching position $M_{cur}$ to the target matching position $M_{ref}$ on the tentative road TR.

This enables the curvature calculator 54 to calculate the tentative road curvature $\rho_{map}$ at the target matching position $M_{ref}$ in accordance with the following equation (9):

$$\rho_{map} = \frac{(\theta_{ref} - \theta_{cur})}{L_{map}} \qquad (9)$$

In step S280, the curvature calculator 54 stores the tentative road curvature $\rho_{map}$ in the memory device 42 as the target road curvature $\rho_{ref}$, terminating the target curvature calculating routine.

This enables the target curvature obtainer 55A to obtain the tentative road curvature $\rho_{map}$ stored in the memory device 42 as the target road curvature $\rho_{map}$.

As described above, the road information 21A according to the sixth embodiment includes, for example, the coordinates of each of interpolation points; the interpolation points are previously determined on each road on which the vehicle VE can travel. The road information 21A also includes connection information representing that each interpolation point is connected to which of the other interpolation points.

Additionally, the curvature calculator 54 obtains, from the road information 21A, the shape of a tentative road TR on which the vehicle VE is located. The curvature calculator 54 also identifies the current matching position $M_{cur}$ of the vehicle VE on the tentative road TR, and the target matching position $M_{ref}$ of the vehicle VE on the tentative road TR.

Then, the curvature calculator 54 identifies the coordinates of at least one intermediate interpolation point located between the current matching position $M_{cur}$ and the target matching position $M_{cur}$.

In addition, the curvature calculator 54 calculates, based on the coordinates of the current matching position $M_{cur}$, the coordinates of the target matching position $M_{ref}$, and the coordinates of the at least one intermediate interpolation point, the tentative road curvature $\rho_{map}$ at the target matching position $M_{ref}$ on the tentative road TR. This enables the target curvature obtainer 55A to obtain the tentative road curvature $\rho_{map}$ as the target road curvature $\rho_{ref}$ at the target position $P_{ref}$.

This configuration eliminates the need to store, in the memory device 42, information indicative of the curvature at any position on each of roads in the areas in which the vehicle VE can travel. This therefore reduces the amount of the road information 21A stored in the memory device 42 as compared with the road information stored in the memory device 42.

In step S270, the curvature calculator 54 can identify, based on the coordinates of the current matching position $M_{cur}$, the coordinates of the target matching position $M_{ref}$, and the coordinates of the at least one intermediate interpolation point, the shape of the tentative road TR in accordance with the known liner least-square method, thus obtaining the tentative road curvature $\rho_{map}$ at the target matching position $M_{ref}$ on the tentative road TR.

Modifications

The present disclosure is not limited to the above described embodiments, and can be variably modified within the scope of the present disclosure.

The target curvature obtainer 55 or 55A according to the described embodiments identifies a value of the driver's visibility to the front using the object information sensor 16 as an environmental sensor and the first visibility-parameter relationship information I1.

Specifically, the target curvature obtainer 55 or 55A can identify a value of the driver's visibility to the front using the illumination sensor 17 or the rain sensor 18 included in the detection unit 10.

When the illumination sensor 17 is installed in the control system 1 as one of the environmental sensors, the target curvature obtainer 55 can obtain, from the illumination sensor 17, a level of the ambient illuminance in the predetermined front region. Next, the target curvature obtainer 55 can identify, in the second visibility-parameter relationship information I2, a numerical level of the driver's front visibility of the vehicle VE; the extracted numerical level of the driver's front visibility off the vehicle VE.

Figure 24:
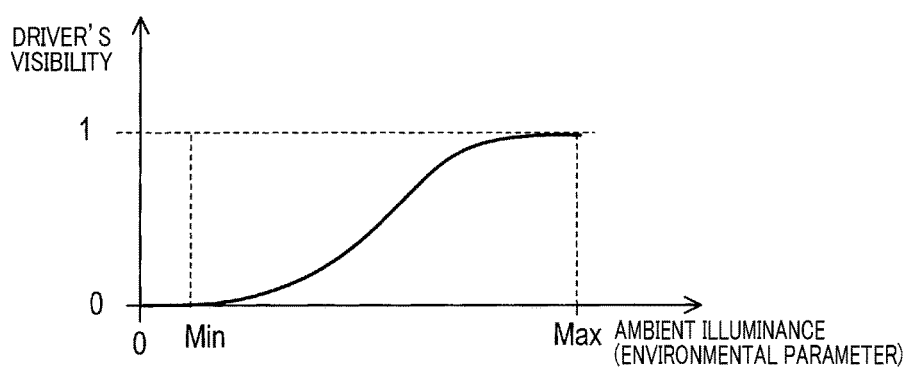
FIG. 24 is a graph schematically illustrating second visibility-parameter relationship information according to a modification of each embodiment.

For example, FIG. 24 illustrates that the second visibility-parameter relationship information I2 shows change of the driver's front visibility of the vehicle VE as a function of the ambient illuminance in the predetermined front region of the vehicle VE.

As illustrated in FIG. 24, the driver's front visibility of the vehicle VE, which is as a function of the ambient illuminance in the predetermined front region of the vehicle VE, increases as the ambient illuminance level in the predetermined front region of the vehicle VE increases. That is, the driver's front visibility of the vehicle VE can increase as the driver's front sight, i.e. forward visibility, becomes better.

The function shows that
1. The maximum level of the driver's front visibility, which is represented as 1, matches with the maximum ambient illuminance level in the predetermined front region of the vehicle VE
2. The minimum level of the driver's front visibility, which is represented as 0, matches with the minimum ambient illuminance level in the predetermined front region of the vehicle VE For example, in step S20, the target curvature obtainer 55 or 55A identifies, based on the second visibility-parameter relationship information I2, a value of the driver's visibility to the front matching with the measured level of the ambient illuminance in the predetermined front region.

A headlamp switch installed in the vehicle VE can be used as one of the environmental sensors in place of the illumination sensor 17. A driver's operation of the headlamp switch enables
1. The headlamps attached to the front of the vehicle 1VE to be turned on or off
2. The illuminance output from the headlamps to be controlled between a plurality of levels; the levels are set from the lowest level to the highest level That is, the target curvature obtainer 55 or 55A stepwisely increases the driver's visibility to the front as the setting of the headlamp switch is changed to stepwisely increase the illuminance output from the headlamps.

When the rain sensor 18 is installed in the control system 1 as one of the environmental sensors, the target curvature obtainer 55 can obtain, from the rain sensor 18, a value of the rainfall amount in the predetermined front region. Next, the target curvature obtainer 55 can identify, in the third visibility-parameter relationship information I3, a numerical level of the driver's front visibility of the vehicle VE; the extracted numerical level of the driver's front visibility off the vehicle VE.

Figure 25:
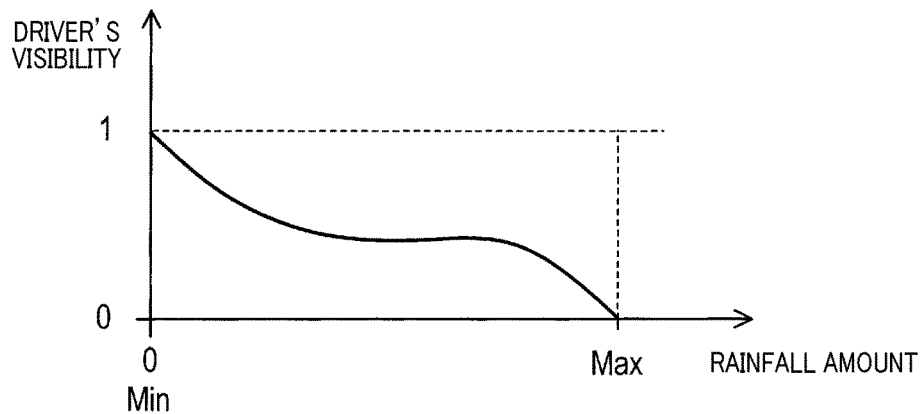
FIG. 25 is a graph schematically illustrating third visibility-parameter relationship information according to another modification of each embodiment.

For example, FIG. 25 illustrates that the third visibility-parameter relationship information I3 shows change of the driver's front visibility of the vehicle VE as a function of the rainfall amount in the predetermined front region of the vehicle VE.

As illustrated in FIG. 25, the driver's front visibility of the vehicle VE, which is as a function of the rainfall amount in the predetermined front region of the vehicle VE, increases as the rainfall amount in the predetermined front region of the vehicle VE decreases. That is, the driver's front visibility of the vehicle VE can increase as the driver's front sight becomes better.

The function shows that
1. The maximum level of the driver's front visibility, which is represented as 1, matches with the minimum rainfall amount in the predetermined front region of the vehicle VE
2. The minimum level of the driver's front visibility, which is represented as 0, matches with the maximum rainfall amount in the predetermined front region of the vehicle VE For example, in step S20, the target curvature obtainer 55 or 55A identifies, based on the third visibility-parameter relationship information I3, a value of the driver's visibility to the front matching with the measured value of the rainfall amount in the predetermined front region.

A wiper switch installed in the vehicle VE can be used as one of the environmental sensors in place of the rain sensor 18. A driver's operation of the wiper switch enables 1. The wiper attached to the windshield of the vehicle 1VE to be turned on or off 2. The movement number of the blades of the wiper per unit time to be controlled between a plurality of levels; the levels are set from the lowest level to the highest level That is, the target curvature obtainer 55 or 55A stepwise reduces the driver's visibility to the front as the setting of the wiper switch is changed to stepwisely increases the movement number of the blades of the wiper per unit time.

A fog lamp switch installed in the vehicle VE can be used as one of the environmental sensors for detecting the weather conditions around the vehicle VE.

Figure 26:
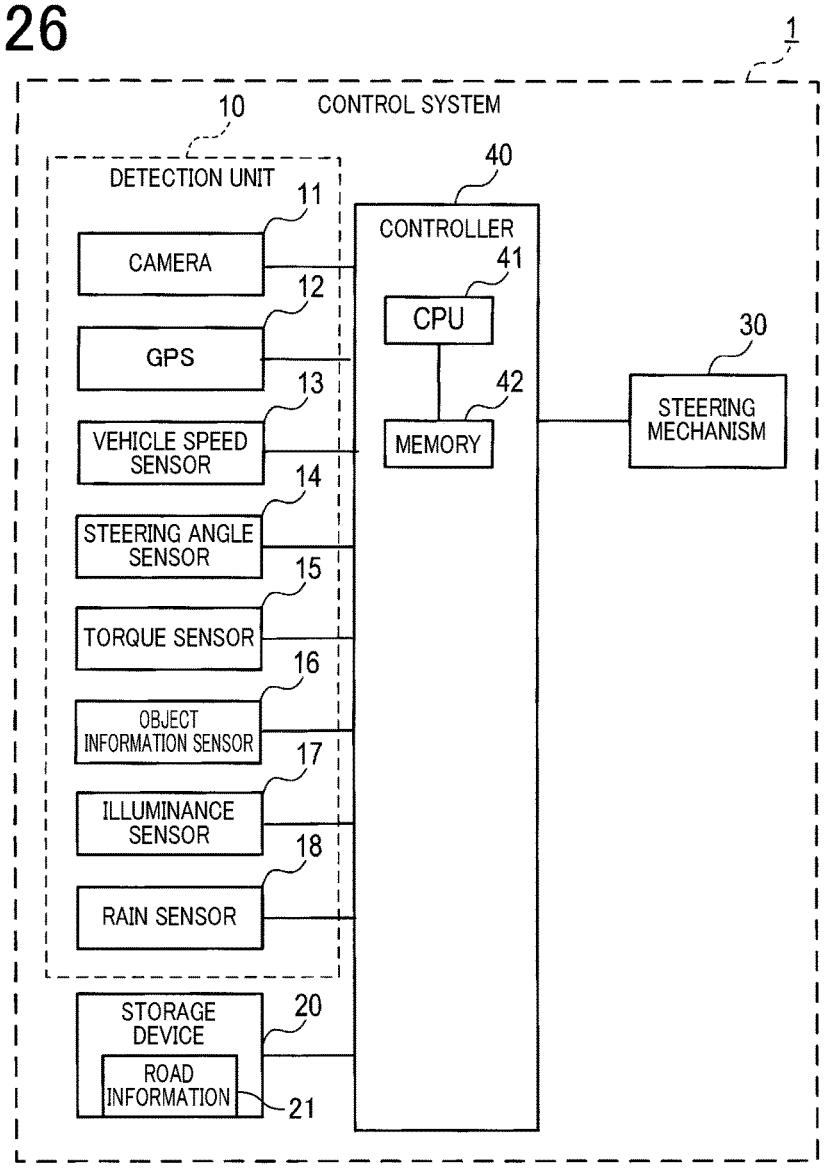
FIG. 26 is a block diagram schematically illustrating an example of a steering system according to a further modification of each embodiment.

As illustrated in FIG. 1, the control system does not include cameras, but can include a camera 11 as illustrated in FIG. 26. Specifically, the camera 11 captures images of the predetermined front region in front of the vehicle VE, and successively transfers the captured images to the controller 40.

The target curvature obtainer 55 analyzes the captured image transferred from the camera 11 to recognize at least one lane marker, i.e. at least one lane making line, based on the analyzed results in accordance one of known recognition methods. Then, the target curvature obtainer 55 obtains, based on the at least one recognized lane marker, a marker recognition rate of the captured image. Note that the marker recognition rate represents a numerical level of the degree of blur of the at least one recognized lane marker included in the captured image. That is, the memory device 42 stores fourth visibility-parameter relationship information I9 indicative of the relationship between a fourth travelling condition parameter, i.e. the lane maker recognition rate and the driver's visibility to the front.

Specifically, the target curvature obtainer 55 calculates the lane marker recognition rate in accordance one of known recognition methods such that the lane marker recognition rate decrease as the degree of blur of the at least one recognized lane marker included in the captured image increases.

The target curvature obtainer 55 can identify, in the fourth visibility-parameter relationship information I9, a numerical level of the driver's front visibility of the vehicle VE; the extracted numerical level of the driver's front visibility off the vehicle VE.

Figure 27:
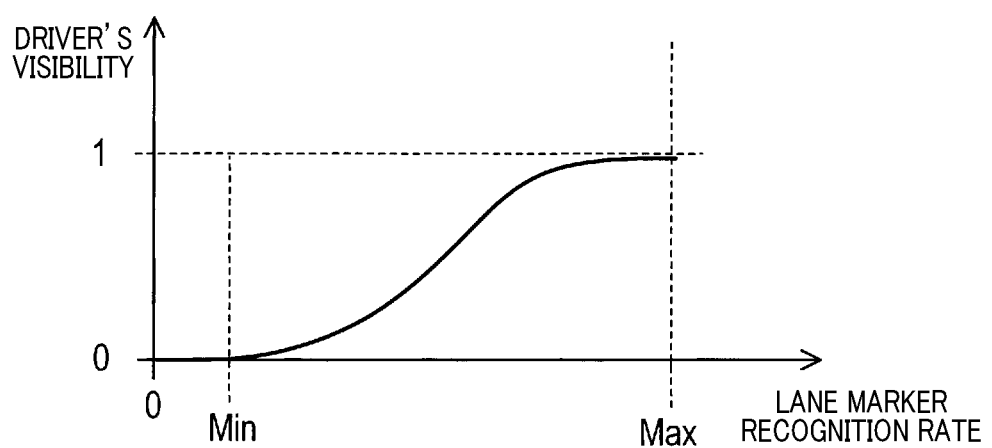
FIG. 27 is a graph schematically illustrating fourth visibility-parameter relationship information according to the further modification of each embodiment.

For example, FIG. 27 illustrates that the fourth visibility-parameter relationship information I9 shows change of the driver's front visibility of the vehicle VE as a function of the lane marker recognition rate.

As illustrated in FIG. 27, the driver's front visibility of the vehicle VE, which is as a function of the lane marker recognition rate, increases as the lane marker recognition rate. That is, the driver's front visibility of the vehicle VE can increase as the driver's front sight becomes better.

The function shows that

1. The maximum level of the driver's front visibility, which is represented as 1, matches with the maximum value of the lane marker recognition rate 2. The minimum level of the driver's front visibility, which is represented as 0, matches with the minimum value of the lane marker recognition rate For example, in step S20, the target curvature obtainer 55 or 55A identifies, based on the fourth visibility-parameter relationship information I9, a value of the driver's visibility to the front matching with the obtained value of the lane marker recognition rate.

This configuration enables, based on the camera 11, the driver's visibility to the front to be identified without using the object information sensor 16, the illumination sensor 17, and the rain sensor 18. This configuration therefore obtains a value of the visible distance $d_s$ of the driver of the vehicle VE corresponding to a value of the driver's visibility to the front, thus determining the target position $P_{ref}$ based on the visible distance $d_s$ of the driver of the vehicle VE.

This configuration therefore achieves advantageous effects identical to the advantageous effects achieved by the controller 40 according to the first embodiment.

The road information 21 or 21A according to the described embodiments is stored in the storage device 20, but the present disclosure is not limited thereto. Specifically, the road information 21 or 21A can be obtained by the control system 1 from a center server of infrastructures placed on the roads. The control system 1 can perform inter-vehicle communications with other vehicles around the vehicle VE to thereby obtain road information 21 or 21A from at least one of the other vehicles.

The target setter 50B according to the sixth embodiment includes the curvature calculator 54 that calculates, based on the road information 21 or 21A, the target road curvature $\rho_{ref}$ at the target position $P_{ref}$. The present disclosure is however not limited to the configuration.

Specifically, the recommended steering-angle calculator 58 illustrated in FIG. 13 can calculate, based on the road information 21A, the curvature at the current matching position $M_{cur}$ on the tentative road TR, and calculate the current steering angle $\delta_{cur}$ based on the calculated curvature.

For example, the curvature calculator 54 can identify target matching positions $M_{ref}$ of the vehicle VE that respectively have different calculation distances apart from the current matching position $M_{cur}$. Then, the curvature calculator 54 can calculate the curvature $\rho_{map}$ of the tentative road TR at each of the target matching positions $M_{ref}$ of the vehicle VE. Then, the curvature calculator 54 can store the curvatures $\rho_{map}$ of the tentative road TR at the respective target matching positions $M_{ref}$ in the memory device 42. Sufficiently reduction of each of the calculation distances enables the curvature at any point on the tentative road TR to be stored in the memory device 42.

The recommended steering-angle calculator 58 according to the third embodiment can obtain, from the memory device 42, the curvature at the current matching position $M_{cur}$ on the tentative road TR as the curvature at the current position $P_{cur}$. This modification of the third embodiment can eliminate the need to store, in the memory device 42, information indicative of the curvature at any position on each of roads in the areas in which the vehicle VE can travel. This therefore reduces the amount of the road information 21A stored in the memory device 42 as compared with the road information stored in the memory device 42.

The functions of one element in each of the first and second embodiments can be distributed as plural elements, and the functions that plural elements have can be combined into one element. At least part of the structure of each of the first and second embodiments can be replaced with a known structure having the same function as the at least part of the structure of the corresponding embodiment. A part of the structure of each of the first and second embodiments can be eliminated. At least part of the structure of each of the first and second embodiments can be added to or replaced with the structures of the other embodiment. All aspects included in the technological ideas specified by the language employed by the claims constitute embodiments of the present invention.

The present disclosure can be implemented by various embodiments in addition to the controller 40; the various embodiments include programs for serving a computer as the controller 40, storage media storing the programs, and control methods.

For example, the current steering-angle calculator 59 corresponds to, for example, a target steering-angle obtainer. The second command calculator 62 corresponds to, for example, a steering controller. The target curvature obtainer 55 and the operation in step S35 correspond to, for example, a distance estimator. The target curvature obtainer 55 and the operation in step S3 correspond to, for example, a distance obtainer. The target curvature obtainer 55 and the operation in step S3 correspond to, for example, a visibility-distance information obtainer. The target curvature obtainer 55 and the operation in step S15 correspond to, for example, a vehicle speed calculator. The target curvature obtainer 55 and the operation in step S31 correspond to, for example, a time setter. The recommended steering-angle calculator 58 corresponds to, for example, a steering angle calculator.

The curvature calculator 54 and the operations in steps S210 and S220 correspond to, for example, an intermediate identifier, and the curvature calculator 54 and the operation in step S270 correspond to, for example, a tentative-road curvature calculator.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling a steering of a vehicle, the apparatus comprising:
   a position obtainer configured to obtain a current position of the vehicle;
   a road information obtainer configured to obtain road information about a road on which the vehicle is travelling, the road information including information indicative of a shape of the road extending in a travelling direction of the vehicle;
   a target curvature obtainer configured to obtain a target curvature at a predetermined target position on the road, the target curvature being estimated based on the current position of the vehicle and the road information, the target position having a predetermined target distance away from the current position along the road in the travelling direction;
   a target steering angle calculator configured to calculate, based on the target curvature, a target steering angle representing the steering angle of the vehicle at the target position;
   a current steering-angle obtainer configured to obtain a current steering angle representing the steering angle of the vehicle at the current position;
   a steering controller configured to control the steering of the vehicle to cause the current steering angle to follow the target steering angle; and
   a distance estimator configured to:
      obtain at least one of environmental information around the vehicle and control information about the vehicle; and
      estimate, based on the at least one of the environmental information around the vehicle and control information about the vehicle, a visible distance representing a distance visibly recognizable by the driver of the vehicle to a front of the vehicle,
   the target curvature obtainer being configured to use the visible distance as the target distance to obtain the target curvature at the predetermined target position that has the visible distance away from the current position along the road in the travelling direction.

2. The apparatus according to claim 1, wherein:
   the distance estimator is configured to:
      obtain a driver's visibility to a front of the vehicle as the environmental information, the driver's visibility representing a numerical value of a visibility of a driver of the vehicle to the front; and
      estimate, based on the obtained driver's visibility, the visible distance.

3. The apparatus according to claim 1, further comprising:
   a distance obtainer configured to obtain a travelled distance that represents a distance that the vehicle has travelled since the current position,
   wherein the steering controller is configured to control the steering of the vehicle to reduce a deviation between the current steering angle and the target steering angle with an increase of the travelled distance.

4. The apparatus according to claim 2, wherein:
   the driver's visibility increases as a driver's front sight becomes better, the apparatus further comprising:
   a visibility-distance information obtainer configured to obtain visibility-distance information, the visibility-distance information being configured such that the visible distance monotonically increases with an increase of the driver's visibility,
   the distance estimator being configured to:
      estimate, based on the obtained driver's visibility and the visibility-distance information, the visible distance corresponding to the obtained driver's visibility.

5. The apparatus according to claim 2, further comprising:
   a vehicle speed obtainer configured to obtain a speed of the vehicle; and
   a time setter configured to set a visible time that represents time depending on the driver's visibility, the time setter being configured to set the visible time such that the visible time increases with an increase of the driver's visibility,
   wherein the distance estimator is configured to calculate a product of the speed of the vehicle and the visible time, and estimate the product of the speed of the vehicle and the visible time as the visible distance.

6. The apparatus according to claim 1, wherein:
   the road information includes a curvature at any point on the road, the apparatus further comprising:
   a steering angle calculator configured to:
      estimate, from the road information, a curvature at the current position on the road; and
      calculate, based on the extracted curvature, a recommended steering angle of the vehicle at the current position,
   the current steering-angle calculator is configured to obtain the recommended steering angle as the current steering angle.

7. The apparatus according to claim 1, wherein:
   the road information includes coordinates of interpolation points and connection information representing that each of the interpolation points is connected to which of the other interpolation points, the interpolation points on the road representing respective positions on the road, the positions being arranged at regular intervals, connection of the interpolation points based on the connection information defining a tentative road, the apparatus further comprising:
a coordinate identifier configured to:
  match the current position with the tentative road to identify, on the tentative road, a current matching position matching with the current position; and
  match the target position with the tentative road to identify, on the tentative road, a target matching position matching with the target position;
an intermediate identifier configured to identify a coordinate of a selected at least one of the interpolation points, the selected at least one interpolation point being located between the current matching position and the target matching position; and
a tentative-road curvature calculator configured to calculate a curvature at the target matching portion on the tentative road in accordance with the coordinate of the current matching position, the coordinate of the target matching position, and the coordinate of the selected at least one interpolation point,
the target curvature obtainer being configured to obtain the curvature at the target matching portion on the tentative road as the target curvature.

8. The apparatus according to claim 1, further comprising:
a curvature gain setter configured to obtain curvature gain information representing change of a curvature gain as a function of the target curvature, the curvature gain information being configured such that the curvature gain decreases with an increase of the target curvature,
wherein the steering controller is configured to control, based on the curvature gain and a deviation between the current steering angle and the target steering angle, the steering of the vehicle.

9. The apparatus according to claim 1, further comprising:
a vehicle speed obtainer configured to obtain a speed of the vehicle; and
a vehicle-speed gain setter configured to obtain vehicle-speed gain information representing change of a vehicle-speed gain as a function of the target curvature, the vehicle-speed gain information being configured such that the vehicle-speed gain increases with an increase of the target curvature,
wherein the steering controller is configured to control, based on the vehicle-speed gain and a deviation between the current steering angle and the target steering angle, the steering of the vehicle.

10. An apparatus for controlling a steering of a vehicle, the apparatus comprising:
a position obtainer configured to obtain a current position of the vehicle;
a road information obtainer configured to obtain road information about a road on which the vehicle is travelling, the road information including information indicative of a shape of the road extending in a travelling direction of the vehicle;
a target curvature obtainer configured to obtain a target curvature at a predetermined target position on the road, the target curvature being estimated based on the current position of the vehicle and the road information, the target position having a predetermined target distance away from the current position along the road in the travelling direction;
a target steering angle calculator configured to calculate, based on the target curvature, a target steering angle representing the steering angle of the vehicle at the target position;
a current steering-angle obtainer configured to obtain a current steering angle representing the steering angle of the vehicle at the current position; and
a steering controller configured to control the steering of the vehicle to cause the current steering angle to follow the target steering angle,
the apparatus being configured to change the target distance based on at least one of environmental information around the vehicle and control information about the vehicle.

11. A method of controlling a steering of a vehicle, the method comprising:
obtaining a current position of the vehicle;
obtaining road information about a road on which the vehicle is travelling, the road information including information indicative of a shape of the road extending in a travelling direction of the vehicle;
obtaining a target curvature at a predetermined target position on the road, the target curvature being estimated based on the current position of the vehicle and the road information, the target position having a predetermined target distance away from the current position along the road in the travelling direction;
calculating, based on the target curvature, a target steering angle representing the steering angle of the vehicle at the target position;
obtaining a current steering angle representing the steering angle of the vehicle at the current position;
controlling the steering of the vehicle to cause the current steering angle to follow the target steering angle;
obtaining at least one of environmental information around the vehicle and control information about the vehicle; and
estimating, based on the at least one of the environmental information around the vehicle and control information about the vehicle, a visible distance representing a distance visibly recognizable by the driver of the vehicle to a front of the vehicle,
the obtaining of the target curvature obtaining using the visible distance as the target distance to obtain the target curvature at the predetermined target position that has the visible distance away from the current position along the road in the travelling direction.

12. A method of controlling a steering of a vehicle, the method comprising:
obtaining a current position of the vehicle;
obtaining road information about a road on which the vehicle is travelling, the road information including information indicative of a shape of the road extending in a travelling direction of the vehicle;
obtaining a target curvature at a predetermined target position on the road, the target curvature being estimated based on the current position of the vehicle and the road information, the target position having a predetermined target distance away from the current position along the road in the travelling direction;
calculating, based on the target curvature, a target steering angle representing the steering angle of the vehicle at the target position;
obtaining a current steering angle representing the steering angle of the vehicle at the current position;
controlling the steering of the vehicle to cause the current steering angle to follow the target steering angle; and changing the target distance based on at least one of environmental information around the vehicle and control information about the vehicle.

* * * * *